US009715678B2

(12) United States Patent
Hill et al.

(10) Patent No.: US 9,715,678 B2
(45) Date of Patent: Jul. 25, 2017

(54) SIDE-BY-SIDE SHARED CALENDARS

(75) Inventors: Brian Hill, Renton, WA (US); Hans Bjordahl, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1104 days.

(21) Appl. No.: 10/607,020

(22) Filed: Jun. 26, 2003

(65) Prior Publication Data
US 2004/0268270 A1 Dec. 30, 2004

(51) Int. Cl.
| G06F 3/0481 | (2013.01) |
| G06F 5/14 | (2006.01) |
| G06Q 10/10 | (2012.01) |
| G09G 5/14 | (2006.01) |
| G06F 9/06 | (2006.01) |
| G06F 3/01 | (2006.01) |

(52) U.S. Cl.
CPC ............ G06Q 10/109 (2013.01); G09G 5/14 (2013.01); *G06F 3/01* (2013.01); *G06F 9/06* (2013.01); *G06F 2203/048* (2013.01)

(58) Field of Classification Search
CPC ............ G06F 3/00; G06F 2203/04803; G06F 3/0481; G06F 9/4443; G09G 5/14
USPC .................................................. 715/752, 963
See application file for complete search history.

(56) References Cited

U.S. PATENT DOCUMENTS

| 4,815,029 A | 3/1989 | Barker et al. |
| 4,823,283 A | 4/1989 | Diehm et al. |
| 5,155,806 A | 10/1992 | Hoeber et al. |
| 5,220,675 A | 6/1993 | Padawer et al. |
| 5,243,697 A | 9/1993 | Hoeber et al. |
| 5,247,438 A * | 9/1993 | Subas et al. ................ 700/90 |
| 5,305,435 A | 4/1994 | Bronson |
| 5,307,086 A * | 4/1994 | Griffin et al. ............. 715/808 |
| 5,323,314 A * | 6/1994 | Baber et al. .................. 705/8 |
| 5,377,354 A | 12/1994 | Scannell et al. |

(Continued)

FOREIGN PATENT DOCUMENTS

| AU | 2005203411 | 3/2006 |
| AU | 2007255043 | 8/2012 |

(Continued)

OTHER PUBLICATIONS

Screen Dumps of Microsoft Outlook (1999, pp. 1-3).*

(Continued)

*Primary Examiner* — Doon Chow
*Assistant Examiner* — Le Nguyen
(74) *Attorney, Agent, or Firm* — Merchant & Gould P.C.

(57) ABSTRACT

Methods and systems are provided for presenting a plurality of shared calendars in a single electronic display frame or window where each of the plurality of shared calendars is displayed in a common view mode relative to other displayed shared calendars. Users may select one or more shared calendars to be displayed in the same display frame or window as their own calendar. Upon selection of a shared calendar to be displayed alongside a first calendar, an aggregate view object is called to control and coordinate all shared calendars selected for display in the common window or frame. The aggregate view object determines the view data object, including view mode (hourly, daily, weekly, monthly) and other calendar display settings of the first or active calendar displayed in the common view of shared calendars.

40 Claims, 10 Drawing Sheets

(56) References Cited

U.S. PATENT DOCUMENTS

| | | | |
|---|---|---|---|
| 5,412,772 A | 5/1995 | Monson | |
| 5,457,476 A | 10/1995 | Jenson | |
| 5,461,708 A | 10/1995 | Kahn | |
| 5,500,936 A | 3/1996 | Allen et al. | |
| 5,502,805 A | 3/1996 | Anderson et al. | |
| 5,519,606 A | 5/1996 | Frid-Nielsen et al. | |
| 5,559,875 A | 9/1996 | Bieselin et al. | |
| 5,559,944 A | 9/1996 | Ono | |
| 5,570,109 A | 10/1996 | Jenson | |
| 5,581,677 A | 12/1996 | Myers et al. | |
| 5,588,107 A | 12/1996 | Bowden et al. | |
| 5,592,602 A | 1/1997 | Edmunds | |
| 5,596,694 A | 1/1997 | Capps | |
| 5,625,783 A | 4/1997 | Ezekiel et al. | |
| 5,634,100 A | 5/1997 | Capps | |
| 5,634,128 A | 5/1997 | Messina | |
| 5,638,504 A | 6/1997 | Scott et al. | |
| 5,644,737 A | 7/1997 | Tuniman et al. | |
| 5,659,693 A | 8/1997 | Hansen et al. | |
| 5,664,127 A | 9/1997 | Anderson et al. | |
| 5,664,208 A | 9/1997 | Pavley et al. | |
| 5,673,403 A | 9/1997 | Brown et al. | |
| 5,694,610 A | 12/1997 | Habib et al. | |
| 5,721,847 A | 2/1998 | Johnson | |
| 5,734,915 A | 3/1998 | Roewer | |
| 5,751,373 A | 5/1998 | Ohyama et al. | |
| 5,760,768 A | 6/1998 | Gram | |
| 5,760,773 A | 6/1998 | Berman et al. | |
| 5,761,646 A | 6/1998 | Frid-Nielsen et al. | |
| 5,764,960 A | 6/1998 | Perks et al. | |
| 5,778,402 A | 7/1998 | Gipson | |
| 5,778,404 A | 7/1998 | Capps et al. | |
| 5,787,295 A | 7/1998 | Nakao | 715/210 |
| 5,793,365 A | 8/1998 | Tang et al. | 715/758 |
| 5,796,393 A | 8/1998 | MacNaughton et al. | |
| 5,805,167 A | 9/1998 | Van Cruyningen | |
| 5,812,132 A | 9/1998 | Goldstein | |
| 5,821,936 A | 10/1998 | Shaffer et al. | |
| 5,828,376 A | 10/1998 | Solimene et al. | |
| 5,838,321 A | 11/1998 | Wolf | |
| 5,842,009 A | 11/1998 | Borovoy et al. | |
| 5,844,558 A | 12/1998 | Kumar et al. | |
| 5,844,572 A | 12/1998 | Schott | |
| 5,844,588 A | 12/1998 | Anderson | |
| 5,850,561 A | 12/1998 | Church | |
| 5,855,006 A * | 12/1998 | Huemoeller et al. | 705/9 |
| 5,864,848 A | 1/1999 | Horvitz et al. | |
| 5,872,973 A | 2/1999 | Mitchell et al. | |
| 5,873,108 A | 2/1999 | Goyal et al. | |
| 5,874,953 A | 2/1999 | Webster et al. | |
| 5,884,572 A | 3/1999 | Kawaguchi | |
| 5,885,006 A | 3/1999 | Sheedy | |
| 5,893,073 A * | 4/1999 | Kasso et al. | 705/8 |
| 5,893,125 A | 4/1999 | Shostak | |
| 5,898,436 A | 4/1999 | Stewart et al. | |
| 5,899,979 A | 5/1999 | Miller et al. | |
| 5,905,863 A | 5/1999 | Knowles et al. | |
| 5,910,895 A | 6/1999 | Proskauer et al. | |
| 5,917,489 A | 6/1999 | Thurlow et al. | |
| 5,924,089 A | 7/1999 | Mocek et al. | |
| 5,926,806 A | 7/1999 | Marshall et al. | |
| 5,936,625 A * | 8/1999 | Kahl et al. | 715/775 |
| 5,937,160 A * | 8/1999 | Davis et al. | 709/203 |
| 5,940,078 A | 8/1999 | Nagarajayya et al. | |
| 5,940,847 A | 8/1999 | Fein et al. | |
| 5,943,051 A * | 8/1999 | Onda et al. | 715/786 |
| 5,960,406 A | 9/1999 | Rasansky et al. | |
| 5,963,938 A | 10/1999 | Wilson | |
| 5,970,466 A * | 10/1999 | Detjen et al. | 705/8 |
| 5,999,173 A | 12/1999 | Ubillos | |
| 5,999,938 A | 12/1999 | Bliss et al. | |
| 6,008,806 A | 12/1999 | Nakajima et al. | |
| 6,012,075 A | 1/2000 | Fein et al. | |
| 6,016,478 A * | 1/2000 | Zhang et al. | 705/9 |
| 6,018,343 A | 1/2000 | Wang et al. | 345/356 |
| 6,034,683 A * | 3/2000 | Mansour et al. | 715/764 |
| 6,038,395 A | 3/2000 | Chow et al. | |
| 6,038,542 A * | 3/2000 | Ruckdashel | 705/9 |
| 6,043,816 A | 3/2000 | Williams et al. | |
| 6,057,836 A | 5/2000 | Kavalam et al. | |
| 6,067,087 A | 5/2000 | Krauss et al. | |
| 6,067,551 A | 5/2000 | Brown et al. | |
| 6,072,492 A | 6/2000 | Schagen et al. | |
| 6,073,110 A | 6/2000 | Rhodes et al. | |
| 6,073,142 A | 6/2000 | Geiger et al. | |
| 6,085,206 A | 7/2000 | Domini et al. | |
| 6,088,707 A | 7/2000 | Bates et al. | |
| 6,092,103 A | 7/2000 | Pritsch | |
| 6,101,480 A | 8/2000 | Conmy et al. | |
| 6,133,915 A | 10/2000 | Arcuri et al. | |
| 6,137,488 A | 10/2000 | Kraft | |
| 6,154,755 A | 11/2000 | Dellert et al. | |
| 6,175,363 B1 | 1/2001 | Williams et al. | |
| 6,188,401 B1 | 2/2001 | Peyer | |
| 6,188,403 B1 | 2/2001 | Sacerdoti et al. | |
| 6,192,381 B1 | 2/2001 | Stiegemeier et al. | |
| 6,195,094 B1 | 2/2001 | Celebiler | 715/764 |
| 6,199,102 B1 | 3/2001 | Cobb | |
| 6,211,879 B1 | 4/2001 | Soohoo | |
| 6,216,122 B1 | 4/2001 | Elson | |
| 6,219,670 B1 | 4/2001 | Mocek et al. | |
| 6,222,540 B1 | 4/2001 | Sacerdoti | |
| 6,232,971 B1 | 5/2001 | Haynes | |
| 6,236,396 B1 | 5/2001 | Jenson et al. | |
| 6,237,135 B1 | 5/2001 | Timbol | |
| 6,239,798 B1 | 5/2001 | Ludolph et al. | |
| 6,256,628 B1 | 7/2001 | Dobson et al. | |
| 6,269,341 B1 | 7/2001 | Redcay, Jr. | |
| 6,272,488 B1 | 8/2001 | Chang et al. | |
| 6,278,450 B1 | 8/2001 | Arcuri et al. | |
| 6,289,317 B1 | 9/2001 | Peterson | |
| 6,307,544 B1 | 10/2001 | Harding | |
| 6,307,574 B1 | 10/2001 | Ashe | |
| 6,311,195 B1 | 10/2001 | Hachiya et al. | |
| 6,313,854 B1 | 11/2001 | Gibson | |
| 6,323,883 B1 * | 11/2001 | Minoura et al. | 715/784 |
| 6,326,962 B1 | 12/2001 | Szabo | |
| 6,327,046 B1 | 12/2001 | Miyamoto et al. | |
| 6,330,589 B1 | 12/2001 | Kennedy | |
| 6,341,277 B1 | 1/2002 | Coden et al. | 707/718 |
| 6,342,901 B1 | 1/2002 | Adler et al. | |
| 6,353,451 B1 | 3/2002 | Teibel et al. | |
| 6,356,893 B1 | 3/2002 | Itakura et al. | |
| 6,359,634 B1 | 3/2002 | Cragun et al. | |
| 6,369,840 B1 * | 4/2002 | Barnett et al. | 715/853 |
| 6,373,507 B1 | 4/2002 | Camara et al. | |
| 6,374,304 B1 | 4/2002 | Chiashi | |
| 6,384,849 B1 | 5/2002 | Morcos et al. | |
| 6,385,769 B1 | 5/2002 | Lewallen | |
| 6,405,216 B1 | 6/2002 | Minnaert et al. | |
| 6,424,829 B1 | 7/2002 | Kraft | |
| 6,429,882 B1 | 8/2002 | Abdelnur et al. | |
| 6,430,563 B1 | 8/2002 | Fritz et al. | 707/694 |
| 6,433,801 B1 | 8/2002 | Moon et al. | |
| 6,433,831 B1 | 8/2002 | Dinwiddie et al. | 348/553 |
| 6,434,598 B1 | 8/2002 | Gish | 709/203 |
| 6,442,527 B1 | 8/2002 | Worthington | |
| 6,446,118 B1 | 9/2002 | Gottlieb | |
| 6,446,240 B1 | 9/2002 | Iyer et al. | |
| 6,456,304 B1 | 9/2002 | Angiulo et al. | |
| 6,457,062 B1 * | 9/2002 | Pivowar et al. | 709/248 |
| 6,459,441 B1 | 10/2002 | Perroux et al. | |
| 6,466,236 B1 * | 10/2002 | Pivowar et al. | 715/835 |
| 6,469,722 B1 | 10/2002 | Kinoe et al. | |
| 6,469,723 B1 | 10/2002 | Gould | |
| 6,480,865 B1 | 11/2002 | Lee et al. | |
| 6,484,180 B1 | 11/2002 | Lyons et al. | |
| 6,493,006 B1 | 12/2002 | Gourdol et al. | |
| 6,493,007 B1 | 12/2002 | Pang | |
| 6,493,731 B1 | 12/2002 | Jones et al. | |
| 6,507,845 B1 | 1/2003 | Cohen et al. | 707/608 |
| 6,529,918 B2 * | 3/2003 | Takahashi | |
| 6,546,417 B1 | 4/2003 | Baker | |
| 6,567,509 B1 | 5/2003 | Gusler et al. | |

(56) References Cited

U.S. PATENT DOCUMENTS

| | | |
|---|---|---|
| 6,570,596 B2 | 5/2003 | Frederiksen |
| 6,578,192 B1 | 6/2003 | Boehme et al. |
| 6,583,798 B1 | 6/2003 | Hoek et al. |
| 6,584,501 B1 * | 6/2003 | Cartsonis et al. ............ 709/224 |
| 6,603,493 B1 | 8/2003 | Lovell et al. |
| 6,618,732 B1 | 9/2003 | White et al. |
| 6,621,504 B1 | 9/2003 | Nadas et al. |
| 6,621,508 B1 | 9/2003 | Shiraishi et al. |
| 6,633,867 B1 | 10/2003 | Kraft et al. |
| 6,635,089 B1 | 10/2003 | Burkett et al. |
| 6,639,611 B1 | 10/2003 | Leduc |
| 6,654,791 B1 | 11/2003 | Bates et al. |
| 6,664,983 B2 | 12/2003 | Ludolph |
| 6,680,749 B1 | 1/2004 | Anderson et al. |
| 6,686,938 B1 | 2/2004 | Jobs et al. |
| 6,691,281 B1 | 2/2004 | Sorge et al. |
| 6,701,513 B1 | 3/2004 | Bailey |
| 6,707,454 B1 | 3/2004 | Barg |
| 6,708,205 B2 | 3/2004 | Sheldon et al. |
| 6,721,402 B2 | 4/2004 | Usami |
| 6,727,919 B1 | 4/2004 | Reder et al. |
| 6,732,330 B1 | 5/2004 | Claussen et al. |
| 6,734,880 B2 | 5/2004 | Chang et al. |
| 6,750,850 B2 | 6/2004 | O'Leary |
| 6,750,890 B1 | 6/2004 | Sugimoto |
| 6,785,868 B1 * | 8/2004 | Raff ............................... 715/530 |
| 6,789,107 B1 | 9/2004 | Bates et al. |
| 6,799,095 B1 | 9/2004 | Owen et al. |
| 6,816,904 B1 | 11/2004 | Ludwig et al. |
| 6,825,859 B1 | 11/2004 | Severenuk et al. |
| 6,826,729 B1 | 11/2004 | Giesen et al. |
| 6,832,244 B1 | 12/2004 | Raghunandan |
| 6,847,989 B1 | 1/2005 | Chastain et al. |
| 6,850,255 B2 | 2/2005 | Muschetto |
| 6,857,103 B1 | 2/2005 | Wason |
| 6,871,195 B2 | 3/2005 | Ryan et al. |
| 6,882,353 B2 | 4/2005 | Nettles et al. |
| 6,882,354 B1 | 4/2005 | Nielsen |
| 6,892,193 B2 | 5/2005 | Bolle et al. |
| 6,892,196 B1 | 5/2005 | Hughes |
| 6,895,426 B1 | 5/2005 | Cortright et al. |
| 6,904,449 B1 | 6/2005 | Quinones |
| 6,906,717 B2 | 6/2005 | Couckuyt et al. |
| 6,907,423 B2 | 6/2005 | Weil et al. |
| 6,915,492 B2 | 7/2005 | Kurtenbach et al. |
| 6,924,797 B1 | 8/2005 | MacPhail |
| 6,925,605 B2 | 8/2005 | Bates et al. .................... 709/206 |
| 6,928,613 B1 | 8/2005 | Ishii |
| 6,934,740 B1 | 8/2005 | Lawande et al. |
| 6,941,304 B2 | 9/2005 | Gainey et al. |
| 6,964,025 B2 | 11/2005 | Angiulo |
| 6,981,209 B1 | 12/2005 | Parikh et al. |
| 6,983,889 B2 | 1/2006 | Alles |
| 6,988,241 B1 | 1/2006 | Guttman et al. |
| 6,990,637 B2 | 1/2006 | Anthony et al. ............... 715/851 |
| 6,990,652 B1 | 1/2006 | Parthasarathy et al. |
| 6,990,654 B2 | 1/2006 | Carroll, Jr. |
| 7,027,463 B2 | 4/2006 | Mathew et al. |
| 7,032,210 B2 | 4/2006 | Alloing et al. |
| 7,039,596 B1 * | 5/2006 | Lu ..................................... 705/8 |
| 7,044,363 B2 | 5/2006 | Silverbrook et al. |
| 7,046,848 B1 | 5/2006 | Olcott |
| 7,069,538 B1 | 6/2006 | Renshaw |
| 7,085,757 B2 | 8/2006 | Dettinger |
| 7,096,218 B2 | 8/2006 | Schirmer et al. |
| 7,103,849 B2 | 9/2006 | Aikawa |
| 7,107,544 B1 | 9/2006 | Luke |
| 7,110,936 B2 | 9/2006 | Hiew et al. |
| 7,111,238 B1 | 9/2006 | Kuppusamy et al. |
| 7,113,941 B2 | 9/2006 | Arend |
| 7,117,370 B2 | 10/2006 | Khan et al. .................... 713/186 |
| 7,134,095 B1 | 11/2006 | Smith et al. |
| 7,149,983 B1 | 12/2006 | Robertson et al. ............ 715/810 |
| 7,152,207 B2 | 12/2006 | Underwood et al. |
| 7,181,697 B2 | 2/2007 | Tai et al. |
| 7,188,073 B1 * | 3/2007 | Tam et al. ......................... 705/9 |
| 7,188,317 B1 | 3/2007 | Hazel ............................. 715/804 |
| 7,200,636 B2 | 4/2007 | Harding |
| 7,206,813 B2 | 4/2007 | Dunbar et al. |
| 7,206,814 B2 | 4/2007 | Kirsch |
| 7,212,208 B2 | 5/2007 | Khozai |
| 7,216,301 B2 | 5/2007 | Moehrle |
| 7,219,305 B2 | 5/2007 | Jennings |
| 7,240,323 B1 | 7/2007 | Desai et al. |
| 7,249,325 B1 | 7/2007 | Donaldson |
| 7,251,640 B2 | 7/2007 | Baumard |
| 7,263,668 B1 | 8/2007 | Lentz ............................. 715/801 |
| 7,277,572 B2 | 10/2007 | MacInnes et al. |
| 7,287,233 B2 | 10/2007 | Arend |
| 7,290,033 B1 | 10/2007 | Goldman et al. ............. 709/206 |
| 7,296,241 B2 | 11/2007 | Oshiro et al. |
| 7,318,203 B2 | 1/2008 | Purves et al. |
| 7,325,204 B2 | 1/2008 | Rogers |
| 7,328,409 B2 | 2/2008 | Awada et al. |
| 7,337,185 B2 | 2/2008 | Ellis et al. |
| 7,346,705 B2 | 3/2008 | Hullot et al. |
| 7,346,769 B2 | 3/2008 | Forlenza et al. |
| 7,356,772 B2 | 4/2008 | Brownholtz et al. ......... 715/752 |
| 7,362,311 B2 | 4/2008 | Filner et al. |
| 7,370,282 B2 | 5/2008 | Cary |
| 7,386,535 B1 | 6/2008 | Kalucha et al. |
| 7,386,835 B1 | 6/2008 | Desai et al. |
| 7,392,249 B1 | 6/2008 | Harris et al. |
| 7,395,221 B2 * | 7/2008 | Doss et al. ........................ 705/9 |
| 7,395,500 B2 | 7/2008 | Whittle et al. |
| 7,421,660 B2 * | 9/2008 | Charnock et al. ............. 715/751 |
| 7,421,690 B2 | 9/2008 | Forstall et al. ................ 709/206 |
| 7,426,713 B2 | 9/2008 | Duggan et al. |
| 7,461,077 B1 | 12/2008 | Greenwood |
| 7,464,343 B2 | 12/2008 | Shaw et al. |
| 7,469,385 B2 | 12/2008 | Harper et al. |
| 7,472,117 B2 | 12/2008 | Dettinger et al. |
| 7,499,907 B2 | 3/2009 | Brown et al. |
| 7,505,954 B2 | 3/2009 | Heidloff et al. |
| 7,530,029 B2 | 5/2009 | Satterfield et al. |
| 7,555,707 B1 | 6/2009 | Labarge et al. |
| 7,565,403 B2 | 7/2009 | Horvitz et al. |
| 7,567,964 B2 | 7/2009 | Brice et al. |
| 7,584,253 B2 | 9/2009 | Curbow et al. |
| 7,627,561 B2 | 12/2009 | Pell et al. |
| 7,661,075 B2 | 2/2010 | Lahdesmaki |
| 7,664,821 B1 | 2/2010 | Ancin et al. .................. 709/206 |
| 7,681,149 B2 | 3/2010 | Lahdesmaki |
| 7,685,116 B2 | 3/2010 | Pell et al. |
| 7,703,036 B2 | 4/2010 | Satterfield et al. |
| 7,707,255 B2 | 4/2010 | Satterfield et al. |
| 7,711,742 B2 | 5/2010 | Bennett et al. |
| 7,716,593 B2 | 5/2010 | Durazo et al. |
| 7,739,259 B2 | 6/2010 | Hartwell et al. |
| 7,747,966 B2 | 6/2010 | Leukart et al. |
| 7,788,598 B2 * | 8/2010 | Bansal et al. .................. 715/810 |
| 7,802,199 B2 | 9/2010 | Shneerson et al. |
| 7,831,902 B2 | 11/2010 | Sourov et al. ................. 715/220 |
| 7,853,877 B2 | 12/2010 | Giesen et al. ................. 715/711 |
| 7,865,868 B2 | 1/2011 | Falzone Schaw et al. |
| 7,870,465 B2 | 1/2011 | VerSteeg ....................... 714/774 |
| 7,886,290 B2 | 2/2011 | Dhanjal et al. ................ 717/170 |
| 7,895,531 B2 | 2/2011 | Radtke et al. ................. 715/810 |
| 8,117,542 B2 | 2/2012 | Radtke et al. |
| 8,146,016 B2 | 3/2012 | Himberger et al. |
| 8,150,930 B2 | 4/2012 | Satterfield et al. |
| 8,171,417 B2 | 5/2012 | Bamford et al. |
| 8,201,103 B2 | 6/2012 | Dukhon et al. |
| 8,239,882 B2 | 8/2012 | Dhanjal et al. |
| 8,255,828 B2 | 8/2012 | Harris et al. |
| 8,285,806 B2 | 10/2012 | Yu |
| 8,402,096 B2 | 3/2013 | Affronti et al. |
| 8,479,122 B2 | 7/2013 | Hotelling et al. |
| 8,484,578 B2 | 7/2013 | Dukhon et al. |
| 8,605,090 B2 | 12/2013 | Garg et al. |
| 8,689,137 B2 | 4/2014 | McCormack |
| 8,762,880 B2 | 6/2014 | Dukhon et al. |
| 8,799,808 B2 | 8/2014 | Satterfield et al. |
| 8,839,139 B2 | 9/2014 | Leukart et al. |

(56) References Cited

U.S. PATENT DOCUMENTS

| | | |
|---|---|---|
| 9,015,621 B2 | 4/2015 | Dean et al. |
| 9,015,624 B2 | 4/2015 | Radtke et al. |
| 9,182,885 B2 | 11/2015 | Ruscher et al. |
| 9,223,477 B2 | 12/2015 | Harris et al. |
| 9,304,658 B2 | 4/2016 | Mercer |
| 2001/0032220 A1 | 10/2001 | Van Hoff ............... 707/513 |
| 2001/0034762 A1 | 10/2001 | Jacobs et al. |
| 2001/0035882 A1 | 11/2001 | Stoakley et al. |
| 2001/0038395 A1 | 11/2001 | Holtzblatt et al. |
| 2001/0040627 A1 | 11/2001 | Obradovich |
| 2001/0044736 A1 | 11/2001 | Jacobs et al. |
| 2001/0044741 A1 | 11/2001 | Jacobs et al. |
| 2001/0049677 A1 | 12/2001 | Talib et al. ............... 707/3 |
| 2002/0004734 A1 | 1/2002 | Nishizawa |
| 2002/0007380 A1 | 1/2002 | Bauchot et al. |
| 2002/0024638 A1 | 2/2002 | Hidari et al. |
| 2002/0029247 A1 | 3/2002 | Kawamoto ............... 709/206 |
| 2002/0037754 A1 | 3/2002 | Hama et al. |
| 2002/0052721 A1 | 5/2002 | Ruff et al. |
| 2002/0052880 A1 | 5/2002 | Fruensgaard et al. ..... 707/104.1 |
| 2002/0052916 A1 | 5/2002 | Kloba et al. |
| 2002/0054101 A1 | 5/2002 | Beatty |
| 2002/0054128 A1 | 5/2002 | Lau et al. |
| 2002/0063734 A1 | 5/2002 | Khalfay et al. |
| 2002/0070977 A1 | 6/2002 | Morcos et al. |
| 2002/0073091 A1 | 6/2002 | Jain et al. |
| 2002/0073156 A1 | 6/2002 | Newman |
| 2002/0075330 A1 | 6/2002 | Rosenzweig et al. |
| 2002/0078143 A1 | 6/2002 | DeBoor et al. |
| 2002/0083054 A1 | 6/2002 | Peltonen et al. |
| 2002/0089543 A1 | 7/2002 | Ostergaard et al. |
| 2002/0091697 A1 | 7/2002 | Huang et al. |
| 2002/0091739 A1 | 7/2002 | Ferlitsch |
| 2002/0097266 A1 | 7/2002 | Hachiya et al. |
| 2002/0099775 A1 | 7/2002 | Gupta et al. |
| 2002/0116508 A1 | 8/2002 | Khan et al. |
| 2002/0122071 A1 | 9/2002 | Camara et al. |
| 2002/0123984 A1 | 9/2002 | Prakash |
| 2002/0123991 A1 | 9/2002 | Asami |
| 2002/0129052 A1 | 9/2002 | Glazer et al. |
| 2002/0133557 A1 | 9/2002 | Winarski |
| 2002/0135621 A1 | 9/2002 | Angiulo et al. |
| 2002/0140731 A1 | 10/2002 | Subramaniam et al. |
| 2002/0140740 A1 | 10/2002 | Chen |
| 2002/0149623 A1 | 10/2002 | West et al. |
| 2002/0149629 A1 | 10/2002 | Craycroft et al. |
| 2002/0154178 A1 | 10/2002 | Barnett et al. |
| 2002/0158876 A1 | 10/2002 | Janssen ............... 345/504 |
| 2002/0163538 A1 | 11/2002 | Shteyn |
| 2002/0175938 A1 | 11/2002 | Hackworth ............... 345/751 |
| 2002/0175955 A1 | 11/2002 | Gourdol et al. |
| 2002/0186257 A1 | 12/2002 | Cadiz et al. ............... 715/764 |
| 2002/0188515 A1 | 12/2002 | Nakata et al. |
| 2002/0196293 A1 | 12/2002 | Suppan et al. |
| 2003/0005051 A1 | 1/2003 | Gottlieb |
| 2003/0005056 A1 | 1/2003 | Yamamoto et al. |
| 2003/0009455 A1 | 1/2003 | Carlson et al. |
| 2003/0011564 A1 | 1/2003 | Ushino et al. |
| 2003/0011638 A1 | 1/2003 | Chung |
| 2003/0011639 A1 | 1/2003 | Webb |
| 2003/0014421 A1 | 1/2003 | Jung ............... 707/102 |
| 2003/0014490 A1 | 1/2003 | Bates et al. |
| 2003/0016248 A1 | 1/2003 | Ubillos |
| 2003/0022700 A1 | 1/2003 | Wang |
| 2003/0025732 A1 | 2/2003 | Prichard |
| 2003/0025737 A1 | 2/2003 | Breinberg |
| 2003/0028560 A1 | 2/2003 | Kudrolli et al. |
| 2003/0035012 A1 | 2/2003 | Kurtenbach et al. |
| 2003/0035917 A1 | 2/2003 | Hyman |
| 2003/0038832 A1 | 2/2003 | Sobol |
| 2003/0043200 A1 | 3/2003 | Faieta et al. |
| 2003/0043211 A1 | 3/2003 | Kremer et al. |
| 2003/0046528 A1 | 3/2003 | Haitani et al. |
| 2003/0050986 A1 | 3/2003 | Matthews et al. |
| 2003/0064707 A1 | 4/2003 | Yoneyama |
| 2003/0066025 A1 | 4/2003 | Garner et al. |
| 2003/0069892 A1 | 4/2003 | Hind et al. |
| 2003/0069900 A1 | 4/2003 | Hind et al. |
| 2003/0070143 A1 | 4/2003 | Maslov |
| 2003/0084035 A1 | 5/2003 | Emerick ............... 707/3 |
| 2003/0093490 A1 | 5/2003 | Yamamoto et al. |
| 2003/0097361 A1 | 5/2003 | Huang et al. |
| 2003/0097640 A1 | 5/2003 | Abrams et al. ............... 715/530 |
| 2003/0098891 A1 | 5/2003 | Molander |
| 2003/0106024 A1 | 6/2003 | Silverbrook et al. ......... 715/515 |
| 2003/0110191 A1 | 6/2003 | Handsaker et al. |
| 2003/0112278 A1 | 6/2003 | Driskell |
| 2003/0128243 A1 | 7/2003 | Okamoto |
| 2003/0132972 A1 | 7/2003 | Pang |
| 2003/0135825 A1 | 7/2003 | Gertner et al. |
| 2003/0154254 A1 | 8/2003 | Awasthi |
| 2003/0156140 A1 | 8/2003 | Watanabe |
| 2003/0160821 A1 | 8/2003 | Yoon |
| 2003/0163537 A1 | 8/2003 | Rohall et al. ............... 709/206 |
| 2003/0167310 A1 | 9/2003 | Moody et al. |
| 2003/0169284 A1 | 9/2003 | Dettinger et al. |
| 2003/0177190 A1 | 9/2003 | Moody et al. |
| 2003/0187586 A1 | 10/2003 | Katzenmaier et al. |
| 2003/0195937 A1 | 10/2003 | Kircher et al. |
| 2003/0200267 A1 | 10/2003 | Garrigues |
| 2003/0206646 A1 | 11/2003 | Brackett |
| 2003/0218611 A1 | 11/2003 | Ben-Tovim et al. |
| 2003/0220138 A1 | 11/2003 | Walker et al. |
| 2003/0225823 A1 | 12/2003 | Meeuwissen et al. |
| 2003/0226106 A1 | 12/2003 | McKellar et al. |
| 2003/0227487 A1 | 12/2003 | Hugh |
| 2003/0229668 A1 | 12/2003 | Malik |
| 2003/0229673 A1 | 12/2003 | Malik |
| 2003/0233419 A1 | 12/2003 | Beringer |
| 2004/0002941 A1 | 1/2004 | Thorne et al. |
| 2004/0003351 A1 | 1/2004 | Sommerer et al. |
| 2004/0006570 A1 | 1/2004 | Gelb et al. ............... 707/102 |
| 2004/0010513 A1 | 1/2004 | Scherr et al. |
| 2004/0012633 A1 | 1/2004 | Helt |
| 2004/0021647 A1 | 2/2004 | Iwema et al. |
| 2004/0024824 A1 | 2/2004 | Ferguson et al. |
| 2004/0030993 A1 | 2/2004 | Hong Huey et al. |
| 2004/0056894 A1 | 3/2004 | Zaika et al. |
| 2004/0061713 A1 | 4/2004 | Jennings |
| 2004/0068695 A1 | 4/2004 | Daniell et al. |
| 2004/0073503 A1 | 4/2004 | Morales et al. |
| 2004/0083432 A1 | 4/2004 | Kawamura et al. ............... 715/526 |
| 2004/0088359 A1 | 5/2004 | Simpson |
| 2004/0090315 A1 | 5/2004 | Mackjust et al. |
| 2004/0093290 A1 | 5/2004 | Doss et al. |
| 2004/0100504 A1 | 5/2004 | Sommer |
| 2004/0100505 A1 | 5/2004 | Cazier |
| 2004/0107197 A1 | 6/2004 | Shen et al. |
| 2004/0109025 A1 | 6/2004 | Hullot et al. |
| 2004/0109033 A1 | 6/2004 | Vienneau et al. |
| 2004/0117451 A1 | 6/2004 | Chung |
| 2004/0119755 A1 | 6/2004 | Guibourge |
| 2004/0119760 A1 | 6/2004 | Grossman et al. |
| 2004/0122789 A1 | 6/2004 | Ostertag et al. |
| 2004/0125142 A1* | 7/2004 | Mock et al. ............... 345/765 |
| 2004/0128275 A1 | 7/2004 | Moehrle |
| 2004/0133854 A1 | 7/2004 | Black |
| 2004/0135811 A1 | 7/2004 | Pickering et al. |
| 2004/0139435 A1 | 7/2004 | Cui et al. |
| 2004/0142720 A1 | 7/2004 | Smethers |
| 2004/0153968 A1 | 8/2004 | Ching et al. ............... 715/513 |
| 2004/0153973 A1 | 8/2004 | Horwitz |
| 2004/0164983 A1 | 8/2004 | Khozai |
| 2004/0168153 A1 | 8/2004 | Marvin |
| 2004/0186775 A1 | 9/2004 | Margiloff et al. |
| 2004/0189694 A1 | 9/2004 | Kurtz et al. |
| 2004/0192440 A1 | 9/2004 | Evans et al. |
| 2004/0196309 A1 | 10/2004 | Hawkins |
| 2004/0205536 A1 | 10/2004 | Newman et al. |
| 2004/0212640 A1 | 10/2004 | Mann |
| 2004/0215612 A1 | 10/2004 | Brody ............... 707/3 |
| 2004/0221234 A1 | 11/2004 | Imai |
| 2004/0221309 A1 | 11/2004 | Zaner et al. |
| 2004/0230508 A1 | 11/2004 | Minnis et al. |

(56) References Cited

U.S. PATENT DOCUMENTS

| | | |
|---|---|---|
| 2004/0230906 A1 | 11/2004 | Pik et al. |
| 2004/0236796 A1 | 11/2004 | Bhatt et al. |
| 2004/0239700 A1 | 12/2004 | Baschy |
| 2004/0243938 A1 | 12/2004 | Weise et al. |
| 2004/0254928 A1 | 12/2004 | Vronay |
| 2004/0260756 A1 | 12/2004 | Forstall et al. |
| 2004/0261013 A1* | 12/2004 | Wynn et al. ............... 715/511 |
| 2004/0268231 A1 | 12/2004 | Tunning |
| 2004/0268235 A1 | 12/2004 | Wason |
| 2005/0004989 A1 | 1/2005 | Satterfield et al. |
| 2005/0004990 A1 | 1/2005 | Durazo et al. |
| 2005/0005235 A1 | 1/2005 | Satterfield et al. |
| 2005/0005249 A1 | 1/2005 | Hill et al. |
| 2005/0010871 A1 | 1/2005 | Ruthfield et al. |
| 2005/0015361 A1 | 1/2005 | Payton et al. |
| 2005/0015364 A1 | 1/2005 | Payton |
| 2005/0021504 A1 | 1/2005 | Atchison |
| 2005/0022116 A1 | 1/2005 | Bowman et al. |
| 2005/0033614 A1 | 2/2005 | Lettovsky et al. ............... 705/5 |
| 2005/0039142 A1* | 2/2005 | Jalon et al. ............... 715/823 |
| 2005/0043015 A1 | 2/2005 | Muramatsu |
| 2005/0044500 A1 | 2/2005 | Orimoto et al. |
| 2005/0055449 A1 | 3/2005 | Rappold, III ............... 709/228 |
| 2005/0057584 A1* | 3/2005 | Gruen et al. ............... 345/752 |
| 2005/0060337 A1 | 3/2005 | Chou et al. |
| 2005/0071242 A1 | 3/2005 | Allen et al. |
| 2005/0086135 A1 | 4/2005 | Lu |
| 2005/0091576 A1 | 4/2005 | Relyea et al. |
| 2005/0097465 A1 | 5/2005 | Giesen et al. |
| 2005/0108348 A1 | 5/2005 | Lee |
| 2005/0114778 A1 | 5/2005 | Branson et al. |
| 2005/0117179 A1 | 6/2005 | Ito et al. |
| 2005/0132010 A1 | 6/2005 | Muller |
| 2005/0132053 A1 | 6/2005 | Roth et al. ............... 709/227 |
| 2005/0138576 A1 | 6/2005 | Baumert et al. |
| 2005/0144284 A1 | 6/2005 | Ludwig et al. ............... 709/226 |
| 2005/0144560 A1 | 6/2005 | Gruen et al. |
| 2005/0144568 A1 | 6/2005 | Gruen et al. ............... 715/822 |
| 2005/0172262 A1 | 8/2005 | Lalwani |
| 2005/0177789 A1 | 8/2005 | Abbar et al. ............... 705/528 |
| 2005/0183008 A1 | 8/2005 | Crider et al. |
| 2005/0185920 A1 | 8/2005 | Harper et al. |
| 2005/0203975 A1 | 9/2005 | Jindal et al. |
| 2005/0216863 A1 | 9/2005 | Schumacher et al. |
| 2005/0223057 A1 | 10/2005 | Buchheit et al. |
| 2005/0223066 A1 | 10/2005 | Buchheit et al. |
| 2005/0223329 A1 | 10/2005 | Schwartz et al. |
| 2005/0234910 A1 | 10/2005 | Buchheit et al. |
| 2005/0240902 A1 | 10/2005 | Bunker et al. |
| 2005/0251757 A1 | 11/2005 | Farn |
| 2005/0256867 A1 | 11/2005 | Walther et al. |
| 2005/0278656 A1 | 12/2005 | Goldthwaite et al. |
| 2005/0289109 A1 | 12/2005 | Arrouye et al. ............... 707/1 |
| 2005/0289156 A1 | 12/2005 | Maryka et al. |
| 2005/0289158 A1 | 12/2005 | Weiss et al. |
| 2005/0289159 A1 | 12/2005 | Hadley et al. |
| 2006/0015816 A1 | 1/2006 | Kuehner et al. |
| 2006/0020962 A1 | 1/2006 | Stark |
| 2006/0026033 A1 | 2/2006 | Brydon et al. ............... 705/1 |
| 2006/0026145 A1 | 2/2006 | Beringer et al. |
| 2006/0026213 A1 | 2/2006 | Yaskin et al. ............... 707/200 |
| 2006/0026242 A1 | 2/2006 | Kuhlmann et al. |
| 2006/0036580 A1 | 2/2006 | Stata |
| 2006/0036945 A1 | 2/2006 | Radtke et al. |
| 2006/0036946 A1 | 2/2006 | Radtke et al. |
| 2006/0036950 A1 | 2/2006 | Himberger et al. |
| 2006/0036964 A1 | 2/2006 | Satterfield et al. |
| 2006/0036965 A1 | 2/2006 | Harris et al. |
| 2006/0041545 A1 | 2/2006 | Heidloff et al. |
| 2006/0047644 A1 | 3/2006 | Bocking et al. |
| 2006/0053383 A1 | 3/2006 | Gauthier et al. |
| 2006/0064434 A1 | 3/2006 | Gilbert et al. ............... 707/104.1 |
| 2006/0069604 A1 | 3/2006 | Leukart et al. |
| 2006/0069686 A1* | 3/2006 | Beyda et al. ............... 707/10 |
| 2006/0074844 A1 | 4/2006 | Frankel et al. |
| 2006/0080303 A1 | 4/2006 | Sargent et al. |
| 2006/0085502 A1 | 4/2006 | Sundararajan et al. |
| 2006/0095865 A1 | 5/2006 | Rostom |
| 2006/0101051 A1 | 5/2006 | Carr et al. |
| 2006/0101350 A1 | 5/2006 | Scott |
| 2006/0111931 A1 | 5/2006 | Johnson et al. |
| 2006/0117249 A1 | 6/2006 | Hu et al. |
| 2006/0117302 A1 | 6/2006 | Mercer et al. ............... 717/131 |
| 2006/0129937 A1 | 6/2006 | Shafron |
| 2006/0132812 A1 | 6/2006 | Barnes et al. ............... 358/1.11 |
| 2006/0155689 A1 | 7/2006 | Blakeley et al. |
| 2006/0161849 A1 | 7/2006 | Miller et al. ............... 715/744 |
| 2006/0161863 A1 | 7/2006 | Gallo ............... 715/810 |
| 2006/0168522 A1 | 7/2006 | Bala |
| 2006/0173824 A1 | 8/2006 | Bensky |
| 2006/0173961 A1 | 8/2006 | Turski et al. |
| 2006/0200455 A1 | 9/2006 | Wilson |
| 2006/0218500 A1 | 9/2006 | Sauve et al. |
| 2006/0224946 A1 | 10/2006 | Barrett et al. |
| 2006/0242557 A1 | 10/2006 | Nortis III |
| 2006/0242575 A1 | 10/2006 | Winser |
| 2006/0248012 A1 | 11/2006 | Kircher et al. ............... 705/50 |
| 2006/0259449 A1 | 11/2006 | Betz et al. ............... 707/1 |
| 2006/0271869 A1 | 11/2006 | Thanu et al. ............... 715/764 |
| 2006/0271910 A1 | 11/2006 | Burcham et al. |
| 2006/0282817 A1 | 12/2006 | Darst et al. |
| 2006/0294452 A1 | 12/2006 | Matsumoto |
| 2006/0294526 A1 | 12/2006 | Hambrick et al. ............... 719/315 |
| 2007/0006206 A1 | 1/2007 | Dhanjal et al. |
| 2007/0011258 A1 | 1/2007 | Khoo |
| 2007/0033250 A1 | 2/2007 | Levin et al. |
| 2007/0050182 A1 | 3/2007 | Sneddon et al. ............... 704/2 |
| 2007/0050401 A1 | 3/2007 | Young et al. |
| 2007/0055936 A1 | 3/2007 | Dhanjal et al. |
| 2007/0055943 A1 | 3/2007 | McCormack et al. |
| 2007/0061306 A1 | 3/2007 | Pell et al. |
| 2007/0061307 A1 | 3/2007 | Hartwell et al. |
| 2007/0061308 A1 | 3/2007 | Hartwell et al. |
| 2007/0061738 A1 | 3/2007 | Taboada et al. |
| 2007/0094230 A1 | 4/2007 | Subramaniam et al. |
| 2007/0101299 A1 | 5/2007 | Shaw et al. |
| 2007/0106951 A1 | 5/2007 | McCormack et al. |
| 2007/0124696 A1 | 5/2007 | Mullender |
| 2007/0130276 A1 | 6/2007 | Zhang et al. |
| 2007/0143662 A1 | 6/2007 | Carlson et al. ............... 715/507 |
| 2007/0143671 A1 | 6/2007 | Paterson et al. |
| 2007/0180040 A1 | 8/2007 | Etgen et al. ............... 709/207 |
| 2007/0185826 A1 | 8/2007 | Brice et al. |
| 2007/0203991 A1 | 8/2007 | Fisher et al. |
| 2007/0240057 A1 | 10/2007 | Satterfield et al. |
| 2007/0260996 A1 | 11/2007 | Jakobson |
| 2007/0266017 A1 | 11/2007 | Held et al. |
| 2007/0279417 A1 | 12/2007 | Garg et al. |
| 2007/0282956 A1 | 12/2007 | Staats ............... 709/206 |
| 2007/0300168 A1 | 12/2007 | Bosma et al. |
| 2008/0005247 A9 | 1/2008 | Khoo |
| 2008/0005686 A1 | 1/2008 | Singh |
| 2008/0034304 A1 | 2/2008 | Feuerbacher et al. |
| 2008/0040682 A1 | 2/2008 | Sorenson et al. |
| 2008/0046518 A1 | 2/2008 | Tonnison et al. |
| 2008/0052670 A1 | 2/2008 | Espinosa et al. |
| 2008/0098229 A1 | 4/2008 | Hartrell et al. |
| 2008/0104505 A1 | 5/2008 | Keohane et al. ............... 715/246 |
| 2008/0109787 A1 | 5/2008 | Wang et al. |
| 2008/0134138 A1 | 6/2008 | Chamieh et al. ............... 717/105 |
| 2008/0141242 A1 | 6/2008 | Shapiro ............... 717/174 |
| 2008/0155555 A1 | 6/2008 | Kwong ............... 719/315 |
| 2008/0168146 A1 | 7/2008 | Fletcher |
| 2008/0178110 A1 | 7/2008 | Hill et al. |
| 2008/0216014 A1 | 9/2008 | Kurtenbach et al. |
| 2008/0244440 A1 | 10/2008 | Bailey |
| 2009/0007003 A1 | 1/2009 | Dukhon et al. |
| 2009/0012984 A1 | 1/2009 | Ravid et al. ............... 707/101 |
| 2009/0083656 A1 | 3/2009 | Dukhon et al. |
| 2009/0100009 A1 | 4/2009 | Karp |
| 2009/0106375 A1 | 4/2009 | Carmel et al. ............... 709/206 |
| 2009/0144651 A1 | 6/2009 | Sprang et al. |
| 2009/0152349 A1* | 6/2009 | Bonev et al. ............... 235/383 |
| 2009/0158173 A1* | 6/2009 | Palahnuk et al. ............... 715/753 |

(56) References Cited

U.S. PATENT DOCUMENTS

| | | |
|---|---|---|
| 2009/0192845 A1 | 7/2009 | Gudipaty et al. |
| 2009/0217192 A1 | 8/2009 | Dean et al. |
| 2009/0222763 A1 | 9/2009 | Dukhon et al. |
| 2009/0319619 A1 | 12/2009 | Affronti |
| 2009/0319911 A1 | 12/2009 | McCann |
| 2010/0011310 A1 | 1/2010 | Rainisto |
| 2010/0060645 A1 | 3/2010 | Garg et al. |
| 2010/0159967 A1 | 6/2010 | Pounds et al. |
| 2010/0180226 A1 | 7/2010 | Satterfield et al. |
| 2010/0191818 A1 | 7/2010 | Satterfield et al. |
| 2010/0211889 A1 | 8/2010 | Durazo et al. |
| 2010/0223575 A1 | 9/2010 | Leukart et al. |
| 2010/0293470 A1 | 11/2010 | Zhao et al. |
| 2011/0041092 A1 | 2/2011 | Zhang |
| 2011/0055673 A1 | 3/2011 | Teng et al. |
| 2011/0055690 A1 | 3/2011 | Wason |
| 2011/0072396 A1 | 3/2011 | Giesen et al. ............... 715/841 |
| 2011/0138273 A1 | 6/2011 | Radtke et al. ............... 715/256 |
| 2011/0296322 A1 | 12/2011 | Dhanjal et al. ............... 715/760 |
| 2012/0179993 A1 | 7/2012 | Himberger et al. |
| 2012/0215866 A1 | 8/2012 | Satterfield et al. |
| 2012/0324394 A1 | 12/2012 | Harris et al. |
| 2013/0014048 A1 | 1/2013 | Satterfield et al. |
| 2013/0159879 A1 | 6/2013 | Affronti et al. |
| 2013/0283207 A1 | 10/2013 | Dukhon et al. |
| 2013/0305141 A1 | 11/2013 | Wason |
| 2014/0019896 A1 | 1/2014 | Satterfield et al. |
| 2014/0115526 A1 | 4/2014 | Hartwell et al. |
| 2014/0132609 A1 | 5/2014 | Garg et al. |
| 2014/0258933 A1 | 9/2014 | Dukhon et al. |
| 2015/0220263 A1 | 8/2015 | Zhao et al. |
| 2015/0309679 A1 | 10/2015 | Dean et al. |
| 2015/0339281 A1 | 11/2015 | Dukhon et al. |
| 2015/0370771 A1 | 12/2015 | Dukhon et al. |
| 2016/0117069 A1 | 4/2016 | Harris et al. |

FOREIGN PATENT DOCUMENTS

| | | | |
|---|---|---|---|
| AU | 2010216342 | 7/2014 | |
| BR | PI0503986 | 3/2006 | |
| CA | 2 650 016 | 9/2014 | |
| CA | 2 512 036 | 11/2015 | |
| CN | 1746914 | 3/2006 | |
| CN | 1755599 A | 4/2006 | |
| CN | 101243439 | 6/2012 | |
| CN | 102067166 B | 6/2013 | |
| CN | 102317897 | 7/2013 | |
| CN | 102077163 | 10/2013 | |
| CN | 102077199 B | 1/2014 | |
| CN | 1553377 | 9/2014 | |
| CN | 201080021957.4 | 11/2014 | |
| EP | 0 584 269 B1 | 3/1994 | |
| EP | 587394 | 3/1994 | |
| EP | 0774722 | 5/1997 | |
| EP | 0851368 | 7/1998 | |
| EP | 0 910 007 | 4/1999 | |
| EP | 1 077 405 A2 | 2/2001 | |
| EP | 1 104 151 | 5/2001 | |
| EP | 1 672 518 | 6/2001 | |
| EP | 1 223 503 | 7/2002 | |
| EP | 1 376 337 | 2/2004 | |
| EP | 1 462 999 A2 | 9/2004 | |
| EP | 1 542 133 A2 | 6/2005 | |
| EP | 1 564 652 | 8/2005 | |
| EP | 1 628 197 | 2/2006 | |
| EP | 1 628 198 | 2/2006 | |
| EP | 1 628 199 | 2/2006 | |
| EP | 1 645 972 | 4/2006 | |
| EP | 1 835 434 A1 | 9/2007 | |
| EP | 1 915 001 | 4/2008 | |
| GB | 2 329 813 | 3/1999 | |
| GB | 2 391 148 | 1/2004 | |
| ID | P 0027717 | 3/2011 | |
| ID | P 0027754 | 3/2011 | |
| ID | P0027754 | 3/2011 | |
| ID | P 0029297 | 10/2011 | |
| JP | 03-043824 | 2/1991 | |
| JP | 04-186425 | 3/1992 | |
| JP | 04-312186 | 11/1992 | |
| JP | 05-204579 | 8/1993 | |
| JP | 06-052282 | 2/1994 | |
| JP | 06-342357 | 12/1994 | |
| JP | 09-204289 | 8/1997 | |
| JP | 10-074217 | 3/1998 | |
| JP | 10-326171 | 12/1998 | |
| JP | 11-039292 | 2/1999 | |
| JP | 11-175258 | 7/1999 | |
| JP | 11-259200 | 9/1999 | |
| JP | 2001-034775 | 2/2001 | |
| JP | 2001-503893 | 3/2001 | |
| JP | 2001-109673 | 4/2001 | |
| JP | 2001-222477 | 8/2001 | |
| JP | 4832024 | 9/2001 | |
| JP | 2001-337944 | 12/2001 | |
| JP | 2003-015719 | 1/2003 | |
| JP | 2003-101768 | 4/2003 | |
| JP | 2003-198630 | 7/2003 | |
| JP | 2003-216427 | 7/2003 | |
| JP | 2003-256258 | 9/2003 | |
| JP | 2003-256302 | 9/2003 | |
| JP | 2003-526820 | 9/2003 | |
| JP | 2003-308145 | 10/2003 | |
| JP | 2003-316630 A | 11/2003 | |
| JP | 2004-078512 | 3/2004 | ............. G06F 17/30 |
| JP | 2004-086893 | 3/2004 | |
| JP | 2004-102803 | 4/2004 | ............. G06F 17/30 |
| JP | 2004-512578 | 4/2004 | |
| JP | 2004-145569 | 5/2004 | ............. G06F 17/21 |
| JP | 2004-159261 | 6/2004 | |
| JP | 2004-185464 | 7/2004 | |
| JP | 2004-318842 | 11/2004 | |
| JP | 2004-342115 | 12/2004 | |
| JP | 2005-025550 | 1/2005 | |
| JP | 2005-31995 | 2/2005 | |
| JP | 2005-032041 | 2/2005 | |
| JP | 2005-182353 | 7/2005 | ............. G06F 17/30 |
| JP | 2005-352849 | 12/2005 | |
| JP | 2006-059358 | 3/2006 | |
| JP | 2007-280180 | 10/2007 | |
| JP | 2007-531165 | 11/2007 | |
| JP | 2008-047067 | 2/2008 | |
| JP | 2008-117019 A | 5/2008 | |
| JP | 2009-507311 | 2/2009 | |
| JP | 2005-236089 | 9/2011 | |
| JP | 4832024 | 9/2011 | |
| JP | 5021185 | 6/2012 | |
| JP | 5079701 | 9/2012 | |
| JP | 5139984 | 11/2012 | |
| JP | 5190452 | 2/2013 | |
| JP | 5193042 | 2/2013 | |
| JP | 5221757 | 3/2013 | |
| JP | 5266384 | 5/2013 | |
| JP | 5480894 | 2/2014 | |
| JP | 5486595 | 2/2014 | |
| JP | 5559817 | 6/2014 | |
| JP | 5559845 | 6/2014 | |
| JP | 5597698 | 8/2014 | |
| KR | 020020066643 | 8/2002 | |
| KR | 10-2003-0070685 | 2/2003 | |
| KR | 10-2005-0023805 A | 3/2005 | |
| KR | 10-2005-0036702 A | 4/2005 | |
| KR | 10-2007-0000506 | 1/2007 | |
| KR | 10-2008-0002811 | 1/2008 | |
| KR | 10-2008-004285 | 5/2008 | |
| KR | 10-2008-0042852 A | 5/2008 | |
| KR | 10-1130421 | 3/2012 | |
| KR | 101129221 B1 | 3/2012 | |
| KR | 10-1149960 | 5/2012 | |
| KR | 10-1149990 | 5/2012 | |
| KR | 10-1159334 | 6/2012 | |
| KR | 101161564 B1 | 7/2012 | |
| KR | 10-1238559 | 2/2013 | |
| KR | 10-1298338 | 8/2013 | |
| KR | 10-1298461 | 8/2013 | |

(56) References Cited

FOREIGN PATENT DOCUMENTS

| | | |
|---|---|---|
| KR | 10-1312867 | 9/2013 |
| KR | 10-1323011 | 10/2013 |
| MX | 315932 | 12/2013 |
| MX | 322458 | 4/2014 |
| MX | 323275 | 9/2014 |
| MX | 323276 | 9/2014 |
| MY | 146456 | 8/2012 |
| MY | 147334 | 7/2013 |
| MY | 149803 | 10/2013 |
| PH | 1-2005-000404 | 8/2011 |
| PH | 1-2005-000495 | 3/2014 |
| PH | 1-2008-500356 | 8/2014 |
| RU | 2001-122576 A | 9/2003 |
| RU | 2005-116667 | 11/2006 |
| RU | 2005-120362 | 1/2007 |
| RU | 2005-130357 | 4/2007 |
| RU | 2322687 | 4/2008 |
| RU | 2327205 C2 | 6/2008 |
| RU | 2328034 | 6/2008 |
| RU | 2332728 C2 | 8/2008 |
| RU | 2537776 C2 | 1/2015 |
| TW | 420953 | 2/2001 |
| TW | 460839 | 10/2001 |
| TW | 490652 | 6/2002 |
| TW | 2003-05097 | 10/2003 |
| TW | 200514018 A | 4/2005 |
| TW | I254878 | 5/2006 |
| TW | 2008-14632 | 3/2008 |
| TW | I368852 | 7/2012 |
| TW | I389002 | 3/2013 |
| TW | I389043 | 3/2013 |
| TW | I401577 | 7/2013 |
| TW | I512591 | 12/2015 |
| WO | 92/21091 | 11/1992 |
| WO | 94/20921 | 9/1994 |
| WO | 96/10231 | 4/1996 |
| WO | 96/39654 | 12/1996 |
| WO | 98/20410 | 5/1998 |
| WO | 99/04353 | 1/1999 |
| WO | WO 99/04353 | 1/1999 |
| WO | WO 99/27495 | 6/1999 |
| WO | WO 01/55894 | 8/2001 |
| WO | WO 02/091162 A3 | 11/2002 |
| WO | WO 03/003240 A2 | 1/2003 |
| WO | WO 03/098500 | 11/2003 |
| WO | 2004/027672 A9 | 4/2004 |
| WO | 2007/030727 A3 | 3/2007 |
| WO | WO 2007/033159 A1 | 3/2007 |
| WO | 2007036762 A1 | 4/2007 |
| WO | WO 2007/027737 A1 | 8/2007 |
| WO | 2008/027477 | 3/2008 |
| WO | 20081027477 | 3/2008 |
| WO | WO 2008/121718 A1 | 10/2008 |
| WO | 2009-158151 | 12/2009 |
| WO | 2009-158171 | 12/2009 |
| WO | 2009-158172 | 12/2009 |
| ZA | 2010/07875 | 2/2010 |
| ZA | 2010/07809 | 2/2012 |
| ZA | 2010/07810 | 2/2012 |
| ZA | 2011/04850 | 12/2012 |

OTHER PUBLICATIONS

Paul J. Perronne, Venkata S. R. "Krishna" R. Chaganti; "Building Java Enterprise Systems with J2EE"; Publisher: Sams; Pub Date: Jun. 7, 2000 (pp. 1-8).*
Marshall school of Business: "Workshop IV—Calendar", http://www.marshall.usc.edu/computing/PDF_Files/Outlook/Workshop4.PDF, Apr. 10, 2000, pp. 1-14.
Williams, Mickey, "Programming Windows NT4: Unleashed", Sams Publishing, Indianapolis, 1996, pp. index and 167-185.
"Microsoft Outlook 2000: Introduction to Calendar", Version 2002.03.25, http://www.uakron.edu/its/learning/training/docs/Calendar032502.pdf, Mar. 25, 2002, pp. 1-52.
U.S. Appl. No. 11/154,278, filed Jun. 16, 2005 entitled "Cross Version and Cross Product User Interface Compatibility".
U.S. Appl. No. 11/151,686, filed Jun. 13, 2005 entitled "Floating Command Object".
U.S. Appl. No. 11/401,470, filed Apr. 10, 2006 entitled "Command User Interface for Displaying Selectable Functionality Controls in a Database Application".
U.S. Appl. No. 10/982,073, filed Nov. 5, 2004 entitled "Gallery User Interface Controls".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/836,154, filed Apr. 30, 2004 entitled "Combined Content Selection and Display User Interface".
U.S. Appl. No. 10/848,774, filed May 19, 2004 entitled "Automatic Grouping of Electronic Mail".
U.S. Appl. No. 10/851,442, filed May 21, 2004 entitled "Conversation Grouping of Electronic Mail Records".
U.S. Appl. No. 10/851,506, filed May 21, 2004 entitled "Adaptive Multi-Line View User Interface".
U.S. Appl. No. 10/955,941, filed Sep. 30, 2004 entitled "An Improved User Interface for Displaying Selectable Software Functionality Controls that are Relevant to a Selected Object".
U.S. Appl. No. 10/955,940, filed Sep. 30, 2004 entitled "An Improved User for Displaying Selectable Software Functionality Controls that are Contextually Relevant to a Selected Object".
U.S. Appl. No. 10/955,967, filed Sep. 30, 2004 entitled "Command User Interface for Displaying Selectable Software Functionality Controls".
U.S. Appl. No. 10/955,942, filed Sep. 30, 2004 entitled "An Improved User Interface for Displaying a Gallery of Formatting Options Applicable to a Selected Object".
U.S. Appl. No. 10/955,928, filed Sep. 30, 2004 entitled "User Interface for Providing Task Management and Calendar Information".
U.S. Appl. No. 10/800,056, filed Mar. 12, 2004 entitled "Method and System for Data Binding in a Block Structured User Interface Scripting Language".
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach et al., "The Hotbox: Efficient Access to a Large Number of Menu-items," ACM, 1999, pp. 231-237, May 1999.
Charles Rich et al., "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.

(56) References Cited

OTHER PUBLICATIONS http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascaded Speech Style Sheets," 1997, 7 pgs.
"Primary Windows," http://www-03.ibm.com/servers/eserver/iseries/navigator/guidelines/primary.html, 23 pgs.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999.
Becker et al., "Virtual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, QUE Corporation, pp. 412, 968.
Danish Written Opinion Appl. No. SG 200504508-3 dated Sep. 18, 2006.
Danish Search Report Appl. No. SG 200504475-5 dated Sep. 19, 2006.
NZ Application No. 541300, Examination Report dated Jul. 25, 2005.
Australian Search Report dated Jan. 16, 2007 cited in Singapore Application No. 200504474-8.
PCT Search Report dated Feb. 26, 2007 cited in International Application No. PCT/US2006/034993.
Australian Written Opinion/Search Report cited in Singapore Application No. 200505257-6 mailed Feb. 12, 2007.
U.S. Office Action dated Dec. 23, 2003 cited in U.S. Appl. No. 09/896,384.
U.S. Notice of Allowance dated Aug. 24, 2004 cited in U.S. Appl. No. 09/896,384.
U.S. Office Action dated Apr. 27, 2006 cited in U.S. Appl. No. 10/800,056.
U.S. Final Office Action dated Oct. 19, 2006 cited in U.S. Appl. No. 10/800,056.
U.S. Office Action dated Apr. 12, 2007 cited in U.S. Appl. No. 10/851,506.
U.S. Office Action dated Jun. 4, 2007 cited in U.S. Appl. No. 10/955,940.
U.S. Office Action dated Jul. 26, 2006 cited in U.S. Appl. No. 10/741,407.
U.S. Final Office Action dated Jan. 23, 2007 cited in U.S. Appl. No. 10/741,407.
U.S. Notice of Allowance dated Apr. 10, 2007 cited in U.S. Appl. No. 10/741,407.
U.S. Office Action dated Jun. 14, 2007 cited in U.S. Appl. No. 10/836,154.
U.S. Office Action dated Jun. 21, 2007 cited in U.S. Appl. No. 10/955,928.
Office Action dated Jul. 11, 2007 cited in U.S. Appl. No. 10/955,941.
U.S. Office Action dated Jul. 11, 2007 cited in U.S. Appl. No. 10/955,967.
U.S. Office Action dated Jul. 11, 2007 cited in U.S. Appl. No. 10/955,942.
U.S. Office Action dated Sep. 26, 2007 cited in U.S. Appl. No. 11/151,686.
U.S. Office Action dated Oct. 9, 2007 cited in U.S. Appl. No. 10/982,073.
Dumps of Microsoft Outlook (1999, pp. 1-3).
U.S. Office Action dated Nov. 25, 2008 cited in U.S. Appl. No. 11/154,278.
U.S. Office Action dated Dec. 11, 2008 cited in U.S. Appl. No. 10/982,073.
U.S. Final Office Action dated Oct. 28, 2008 cited in Appl. No. 11/151,686.
Philippines Examiner's Action dated Aug. 19, 2008 cited in Application No. 1-2005-000405.
Chinese Second Office Action dated Oct. 10, 2008 cited in Application No. 200510092141.1.
Chinese Second Office Action dated Oct. 17, 2008 cited in Application No. 200510092139.4.
Philippines Examiner's Action dated Sep. 12, 2008 cited in Application No. 1200500406.
Microsoft Office 11 Beta Layperson's Specification, Copyright 2002, Microsoft Corporation, 28 pgs.
FrontPage 11 Beta Layperson's Specification, Copyright 2002, Microsoft Corporation, 12 pgs.
Office 11 Beta Letter, Copyright 2002, Microsoft Corporation, 6 pgs.
Microsoft XDocs Beta Layperson Specification, Copyright 2002, Microsoft Corporation, 3 pgs.
Microsoft Publisher 11 Beta Layperson's Specification, Copyright 2002, Microsoft Corporation, 13 pgs.
Chinese Office Action dated May 23, 2008 cited in Application No. 200510089514.X.
Philippine Official Action dated Jul. 31, 2008 cited in Philippine Application No. 12005000495.
European Communication dated Jun. 23, 2008 cited in European Application No. 04102463.9-2211/1517239.
Chinese Office Action dated Apr. 18, 2008 cited in Application No. 200510092142.6.
U.S. Final Office Action dated Jul. 24, 2008 cited in U.S. Appl. No. 11/151,686.
Microsoft Office Word 2003. Part of Microsoft Office Professional Edition 2003. Copyright 1983-2003 Microsoft Corporation.
U.S. Office Action dated Feb. 20, 2008 cited in U.S. Appl. No. 10/848,774.
U.S. Office Action dated Feb. 21, 2008 cited in U.S. Appl. No. 10/851,442.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
U.S. Official Action dated Dec. 21, 2007 in U.S. Appl. No. 10/851,506.
U.S. Official Action dated Dec. 28, 2007 in U.S. Appl. No. 10/800,056.
U.S. Official Action dated Jan. 8, 2008 in U.S. Appl. No. 10/955,928.

(56) References Cited

OTHER PUBLICATIONS

Chinese First Office Action dated Apr. 11, 2008 cited in Application No. 200510092141.1.
U.S. Final Office Action dated Apr. 15, 2008 cited in U.S. Appl. No. 10/955,942.
Screendumps Microsoft Corporation, Microsoft Office Professional Edition 2003, 5 pgs.
U.S. Final Office Action dated Apr. 16, 2008 cited in U.S. Appl. No. 10/955,967.
Screendumps Microsoft Corporation, Microsoft Office Professional Edition 2003, 4 pgs.
U.S. Final Office Action dated May 28, 2008 cited in U.S. Appl. No. 10/982,073.
Chinese Official Action dated Mar. 21, 2008 cited in Chinese Application No. 200510092146.4.
Chinese Official Action dated Mar. 21, 2008 cited in Chinese Application No. 200510092139.4.
Philippine Official Action dated Apr. 21, 2008 cited in Philippine Application No. 1-2005-000405.
Philippine Official Action dated Apr. 21, 2008 cited in Philippine Application No. 1-2005-000406.
U.S. Final Office Action dated Apr. 29, 2008 cited in U.S. Appl. No. 10/955,941.
Habraken, Microsoft Office XP 8 in 1, published Jun. 5, 2001, http://proquest.safaribooksonline.com/0789725096/, 12 pgs.
Word 2002, Chapter 14; Paradigm Publishing Inc., copyright 2002; http://www.emcp.com/tech_tutorials/sig_irc/Signature_Word_Chapter_14.ppt, 21 pgs.
U.S. Official Action dated Jan. 28, 2008 in U.S. Appl. No. 10/836,154.
Chilean Office Action dated Mar. 28, 2008 cited in Application No. 1770-05, no English Translation.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Chinese Second Office Action dated Nov. 21, 2008 cited in Appln No. 200510089514.X.
U.S. Official Action dated Jun. 19, 2008 cited in U.S. Appl. No. 10/851,506.
U.S. Official Action dated Jun. 20, 2008 cited in U.S. Appl. No. 10/955,928.
U.S. Official Action dated Jul. 17, 2008 cited in U.S. Appl. No. 10/955,940.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
U.S. Office Action dated Jul. 13, 2007 cited in U.S. Appl. No. 10/800,056.
U.S. Final Office Action dated Dec. 4, 2007 cited in U.S. Appl. No. 10/955,940.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
U.S. Appl. No. 12/372,386, filed Feb. 17, 2009 entitled "Command User Interface for Displaying Multiple Sections of Software Functionality Controls".
U.S. Office Action dated Mar. 18, 2009 in U.S. Appl. No. 11/401,470.
U.S. Office Action dated Apr. 7, 2009 in U.S. Appl. No. 10/955,940.
Chilean Second Office Action dated Mar. 4, 2009 cited in Appln No. 2512-2005.
U.S. Office Action dated Apr. 28, 2009 in U.S. Appl. No. 12/028,797.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z0lzks9a(VS.71).aspx, 2008.
Agarwal, Vikash K., "Creating a Visually Arresting User-Interface: A₃D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/onmiweb/browser/tabs.html, 2 pages.
Hepfner, Troy, "New SOCET CXP Interface Improves Usability," Sep. 2008, http://www.socetset.com/gxpmosaic/?p=95, 4 pages.
Chinese Office Action dated Apr. 3, 2009 cited in Appln No. 200510089514.X.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chinese Third Office Action dated Jun. 19, 2009 cited in Appln No. 200510092139.4.
Russian Office Action dated Jun. 24, 2009 cited in Appln No. 2005120363/28(023023).
U.S. Official Action dated Feb. 22, 2008 in U.S. Appl. No. 11/445,393.
U.S. Official Action dated Oct. 8, 2008 cited in U.S. Appl. No. 11/445,393.
U.S. Official Action dated Jun. 1, 2009, U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
Official Action dated Jun. 11, 2009 in U.S. Appl. No. 11/151,686.
"Convert to Word 2007," http://www.regencytraining.com/word-2007-conversion.html, Regency Training and Consulting, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," Natural Language Engineering, vol. 11, No. 1, pp. 67-86 (Mar. 2005) (2 page Abstract).
Bos, B, "Re: A proposal for addition to HTML 3.0: Frames,"http://www.nyct.net/~aray/htmlwg/95q3/1141.html, 5 pages (Sep. 21, 1995).
de Candussio, N., "Common GUI Features Report," Herschel CSDT Meeeting, pp. 1-21 (Sep. 2007).
Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).

(56) References Cited

OTHER PUBLICATIONS

Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014, 1173-1175.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
PCT Search Report dated Feb. 6, 2007 cited in International Application No. PCT/US2006/035467.
International Search Report dated Nov. 27, 2007 in PCT/US2007/012573, 9 pages.
Supplementary European Search Report dated May 28, 2009 cited in EP Application No. 07795391.7-1225.
International Search Report dated Nov. 2007 in PCT/US2007/012573, 9 pages.
European Communication dated Jun. 9, 2009 cited in EP Application No. 07795391.7-1225.
Mexican Office Action dated Jun. 19, 2009 cited in Appln. No. PA/a/2005/007073.
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
European Search Report dated Sep. 7, 2009 cited in EP Application No. 09006972.5-2211.
European Communication dated Sep. 14, 2009 cited in Appln. No. 07795391.7-1225.
U.S. Official Action dated Sep. 6, 2007 in U.S. Appl. No. 11/136,800.
U.S. Official Action dated May 30, 2008 cited in U.S. Appl. No. 11/430,562.
U.S. Official Action dated Jun. 27, 2008 cited in U.S. Appl. No. 11/430,416.
U.S. Official Action dated Jul. 9, 2008 cited in U.S. Appl. No. 11/136,800.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 18, 2009 in U.S. Appl. No. 11/782,059.
U.S. Official Action dated Sep. 23, 2009 in U.S. Appl. No. 11/401,470.
International Search Report dated Oct. 17, 2007 cited in International Application No. PCT/US2006/012724.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Israeli Office Action dated Sep. 6, 2009 cited in Appln No. 169716.
Israeli Office Action dated Sep. 7, 2009 cited in Appln No. 169718.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 28, 2009 cited in Appln No. 09006972.5-2211.
Chinese Office Action dated Oct. 16, 2009 cited in Appln No. 200510092142.6.
U.S. Official Action dated Nov. 24, 2009 in U.S. Appl. No. 11/445,393.
Russian Office Action dated Oct. 26, 2009 cited in Appln No. 2005120363/09(023023).
PCT Search Report and Written Opinion dated Dec. 29, 2009 cited in International Application No. PCT/US2009/046344.
U.S. Official Action dated Nov. 13, 2009 in U.S. Appl. No. 11/154,278.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
Office Action dated Jan. 25, 2010 cited in U.S. Appl. No. 10/982,073.
U.S. Appl. No. 12/725,605, filed Mar. 17, 2010 entitled "Improved User Interface for Displaying Displaying Selectable Software Functionality Controls that are Relevant to a Selected Object".
U.S. Appl. No. 12/753,923, filed Apr. 5, 2010 entitled "Automatic Grouping of Electronic Mail".
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.xl.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquire.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Screendumps—Microsoft Office (Microsoft Corporation, Microsoft Office Professional Edition 2003; 16 pages).
NZ Application No. 541301, Examination Report dated Jul. 25, 2005.
NZ Application No. 541299, Examination Report dated Jul. 25, 2005.
Russian Office Action dated Oct. 30, 2009 cited in Appln No. 2005125837/09(029011).
Chilean Second Office Action dated Nov. 4, 2009 cited in Appln No. 1770-2005.
Chinese Office Action dated Nov. 27, 2009 cited in Appln No. 200680033212.3.
Chilean Second Office Action dated Dec. 4, 2009 cited in Appln No. 1768-2005.
Russian Office Action dated Dec. 28, 2009 cited in Appln No. 2005125836/09(029010).
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
U.S. Official Acton dated Nov. 13, 2008 in U.S. Appl. No. 11/430,562.

(56) References Cited

OTHER PUBLICATIONS

U.S. Official Action dated Jan. 9, 2009 in U.S. Appl. No. 11/430,561.
U.S. Official Acton dated Jun. 19, 2009 in U.S. Appl. No. 11/430,562.
U.S. Official Acton dated Jan. 7, 2010 in U.S. Appl. No. 11/430,562.
U.S. Official Action dated Jan. 20, 2010 in U.S. Appl. No. 10/955,967.
U.S. Official Action dated Jan. 25, 2010 in U.S. Appl. No. 10/982,073.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
U.S. Official Action dated Apr. 15, 2010 in U.S. Appl. No. 11/823,999.
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces" c.
Clifton, The Application Automation layer—Using XML to Dynamically Generale GUI Elements—forms and controls, The Code Project, Jun. 2003, pp. 1-37.
Australian Office Action dated May 28, 2010 cited in Appln No. 2005202717.
U.S. Official Action dated Mar. 30, 2010 in U.S. Appl. No. 11/217,071.
Official Action dated May 5, 2010 in U.S. Appl. No. 10/851,506.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
U.S. Official Action dated Jul. 6, 2010 in U.S. Appl. No. 10/955,967.
ScreenShot of MS_Office_2003; (Microsoft Corporation, Microsoft Office Professional Edition 2003; 6 pages).
Halvorson et al., Microsoft Office Professional Official Manual, Aug. 20, 2002, 10 pgs.
Chinese Second Office Action dated Jul. 6, 2010 cited in Appln No. 200680033212.3.
Mexican Office Action dated Aug. 12, 2010 cited in Appln No. 2005/008354.
U.S. Official Action dated Aug. 2, 2010 in U.S. Appl. No. 10/955,942.
U.S. Official Action dated Aug. 6, 2010 in U.S. Appl. No. 11/401,470.
PCT Written Opinion and Search Report dated Jan. 9, 2007 cited in International Application No. PCT/US2006/033809.
European Office Action mailed Mar. 9, 2009, cited in Appln No. 06790087.8.
Official Action dated Sep. 15, 2009 in U.S. Appl. No. 11/217,071.
U.S. Official Action dated Sep. 21, 2010 in U.S. Appl. No. 11/217,071.
U.S. Official Action dated Sep. 27, 2010 in U.S. Appl. No. 10/836,154.
"The New "Office 2007" User Interface", Microsoft Corporation © 2005, 32 pgs.
"The New Look in Office 12 / Office 2007", OFFICE Watch, posted Sep. 20, 2005, 9 pgs.
Atwood, "Sometime a Word is Worth a Thousand Icons", Coding Horror, Feb. 22, 2006, 9 pgs.
PCT Written Opinion and Search Report dated Nov. 29, 2010 cited in International Application No. PCT/US2010/034277.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.
Redmond, Tony; Excerpt from Book; Microsoft Exchange Server 2003; Published 2003; 14 pgs.
Chinese Office Action dated Jul. 2, 2012 in Appln No. 200980124944.7.
Chinese Office Action dated Jul. 12, 2012 in Appln No. 201080008789.5.
Chinese Decision on Rejection dated Jul. 31, 2012 cited in Appln No. 200680018095.3.
Chinese Office Action dated Aug. 2, 2012 in Appln No. 200980124945.1.
U.S. Official Action dated Nov. 22, 2010 in U.S. Appl. No. 11/782,059.
U.S. Official Action dated Nov. 26, 2010 in U.S. Appl. No. 12/753,923.
U.S. Appl. No. 13/027,289 filed Feb. 15, 2011 entitled "Floating Command Object".
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.
Whitechapel et al., "Microsot Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VST02005SE_Tutorial.doc+This+tutorial+focuses+on+the+new+features+introduced+in+VSTO+2005_SE&hl=en&ct=c1nk&cd=3&gl=in.
European Search Report dated Nov. 25, 2008 cited in Application EP 06 79 0087.
Mexican Office Action dated May 4, 2010 cited in Appln No. 2005/008354.
Israeli Office Action dated Jul. 5, 2010 cited in Appln No. 169718.
Notice on Reexamination dated Jan. 21, 2011 cited in Appln No. 200510089514.X.
Chinese Third Office Action dated Feb. 10, 2011 cited in Appln No. 200680033212.3.
U.S. Official Action dated Dec. 20, 2010 in U.S. Appl. No. 12/574,256.
U.S. Official Action dated Feb. 11, 2011 in U.S. Appl. No. 11/401,470.
EP Search Report dated Apr. 18, 2013 in Appln No. PCT/US2006/012724, 12 pgs.
Philippines Substantive Examination Report dated Apr. 25, 2013 cited in Appln No. 1-2005-000495.
Mexican Office Action dated May 23, 2013 in Appln No. MX/a/2008/003342.
U.S. Official Action dated May 21, 2013 in U.S. Appl. No. 13/437,031, 13 pgs.
U.S. Official Action dated May 23, 2013 in U.S. Appl. No. 11/401,470, 101 pgs.
Miser, "Special Edition Using Mac OS X v10.2"; Pub. Date Jan. 3, 2003; QUE; Spe. Ed.; pp. 272-275 (cited in Apr. 18, 2013 OA).

(56) References Cited

OTHER PUBLICATIONS

Mori et al., "Design and Development of Multidevice User Interfaces through Multiple Logical Descriptions"; Aug. 2004; vol. 30; 14 pgs. (cited in Apr. 25, 2013 NOA).
Canadian Office Action dated Nov. 29, 2012 cited in Appln No. 2,511,101 3 pgs.
Korean Notice of Rejection dated Feb. 22, 2013 in Appln No. 10-2008-7005078 13 pgs.
Korean Notice of Rejection dated Feb. 25, 2013 in Appln No. 10-2008-7005366, 5 pgs.
Japanese Notice of Preliminary Rejection dated Mar. 12, 2013 in Appln No. 2011-516371, 4 pgs.
Korean Notice of Preliminary Rejection dated Mar. 19, 2013 in Appln No. 10-2008-7005659, 4 pgs.
Japanese Notice of Preliminary Rejection dated Mar. 19, 2013 in Appln No. 2011-514652, 6 pgs.
Chinese Fourth Office Action dated Apr. 23, 2013 cited in Appln No. 200980124944.7, 7 pgs.
U.S. Official Action dated Mar. 14, 2013 in U.S. Appl. No. 12/574,256, 73 pgs.
U.S. Official Action dated Apr. 1, 2013 in U.S. Appl. No. 12/163,784, 39 pgs.
U.S. Official Action dated Apr. 4, 2013 in U.S. Appl. No. 11/782,059, 39 pgs.
U.S. Official Action dated Apr. 18, 2013 in U.S. Appl. No. 10/851,506, 34 pgs.
U.S. Official Action dated Apr. 29, 2013 in U.S. Appl. No. 12/954,952, 18 pgs.
Microsoft Office 2007 Word Help, 3 pgs.
Alexander, Keeping New Messages Marked 'Unread' (2007), http://certcities.com/editorial/colums/story.asp?EditorialsD=243, 2 pgs.
Wiley, Microsoft® Office Outlook® 2007 for Dummies®, 9 pgs.
Israeli Office Action dated Jun. 3, 2012 cited in Appln No. 189293.
Israeli Office Action dated Aug. 29, 2012 in Appln No. 169717.
Canadian Office Action dated Nov. 29, 2012 cited in Appln No. 2,512,036.
Russian Office Action dated Dec. 12, 2012 cited in Appln No. 2010140069.
Chinese Second Office Action dated Dec. 17, 2012 cited in Appln No. 200980124644.9.
Chinese Third Office Action dated Dec. 31, 2012 in Appln No. 200980124944.7.
Chinese Second Office Action dated Dec. 31, 2012 in Appln No. 200980124945.1.
Chinese Second Office Action dated Jan. 4, 2013 in Appln No. 201080008789.5.
Chinese Office Action dated Jan. 6, 2013 in Appln No. 201080021957.4.
EP Communication dated Jan. 10, 2013 cited in Appln No. PCT/US2010/021888, 8 pgs.
Malaysian Substantitive Examination Adverse Report dated Jan. 15, 2013 in Appln No. PI 20084401, 3 pgs.
Canadian Office Action dated Jan. 18, 2013 in Appln No. 2,512,155, 6 pgs.
Mexican Office Action dated Feb. 5, 2013 cited in Appln No. MX/a/2008/014849, 8 pgs.
Chinese Office Action dated Feb. 5, 2013 cited in Appln No. 200910148820.4, 5 pgs.
U.S. Official Action dated Dec. 12, 2012 in U.S. Appl. No. 10/851,506.
U.S. Official Action dated Dec. 12, 2012 in U.S. Appl. No. 12/954,952.
U.S. Official Action dated Dec. 31, 2012 in U.S. Appl. No. 12/142,927.
U.S. Official Action dated Sep. 11, 2012 in U.S. Appl. No. 12/163,784.
U.S. Official Action dated Sep. 13, 2012 in U.S. Appl. No. 13/437,031.
Russel et al., (hereinafter "Russel"); "Special Edition Using Microsoft® Office Outlook ® 2003"; Que publishing on Sep. 25, 2003, 71 pgs.
Israeli Office Action dated May 3, 2012 cited in Appln No. 169718.
Taiwan Office Action dated May 14, 2012 cited in Appln No. 94122180, with Eng Lang Summary.
Chinese Second Office Action dated Jun. 18, 2012 in Appln No. 200910148820.4.
U.S. Official Action dated Jun. 6, 2012 in U.S. Appl. No. 12/777,287.
U.S. Official Action dated Jun. 19, 2012 in U.S. Appl. No. 12/769,787.
U.S. Appl. No. 13/464,572, filed May 4, 2012 entitled "Accessing an Out-Space User Interface for a Document Editor Program".
Changing a Graph Type: Ultimate Illustration of Excel 2002 for Windows XP, General Book, X-media Corp., Aug. 31, 2002, p. 224.
Mexican Office Action dated Feb. 3, 2012 cited in Appln No. MX/a/2008/002889 with summary.
Taiwan Office Action dated Feb. 8, 2012 cited in Appln No. 94123640, with Eng Lang Summary.
Israeli Office Action dated Feb. 23, 2012 cited in Appln No. 170668.
Chinese Fourth Office Action dated Apr. 27, 2012 cited in Appln No. 200680018095.3.
Japanese Notice of Rejection dated May 11, 2012 cited in Appln No. 2009-513223.
Mexican Office Action dated Jun. 6, 2012 cited in Appln No. MX/a/2008/014849.
U.S. Official Action dated Apr. 26, 2012 in U.S. Appl. No. 11/782,059.
U.S. Official Action dated May 8, 2012 in U.S. Appl. No. 12/144,642.
U.S. Appl. No. 13/437,031, filed Apr. 2, 2012 entitled "Automatic Grouping of Electronic Mail".
U.S. Appl. No. 13/427,939, filed Mar. 23, 2012 entitled "An Improved User Interface for Displaying a Gallery of Formatting Options Applicable to a Selected Object".
Douglas et al., "Dynamic Popup Menu Titles"; IP.Com Journal, IP.COM Inc., West Henrietta, NY, Aug. 1, 1992, 2 pgs.
Haden et al.; "Scrollable Popup Menu with Selection Tracking Display of Graphical Objects"; IP.Com Journal, IP.COM Inc., West Henrietta, NY, Aug. 1, 1994, 6 pgs.
"Index Card Metaphor for Multiple Property Sheets Associated with A Given Object"; IBM Technical Disclosure Bulletin, International Business Machines Corp., vol. 33, No. 3A, Aug. 1, 1990, 2 pgs.
"Menu Selection Method for Related Attributes"; IBM Technical Disclosure Bulletin, International Business Machines Corp., vol. 33, No. 6B, Nov., 1990, 3 pgs.
Ribbons; Microsoft; © 2012 Microsoft; http://msdn.microsoft.com/en-us/library/windows/desktop/cc872782.aspx; 45 pgs.
AutoCAD 2011—Customization Guide; Feb. 2010; Autodesk, Inc.; http://images.autodesk.com/adsk/files/acad_acg.pdf; 554 pgs.
Chinese Decision on Reexamination dated Feb. 1, 2012 cited in Appln No. 200510089514.X.
European Search Report dated Feb. 15, 2012 cited in Appln No. 05107157.9.
European Search Report dated Feb. 28, 2012 cited in Appln No. 05107184.3.
Taiwan Search Report dated Mar. 14, 2012 cited in Appln No. 094123420.
European Search Report dated Mar. 16, 2012 cited in Appln No. 05107186.6.
Taiwan Notice of Allowance dated Mar. 29, 2012 cited in Appln No. 10120306600.
Chilean Office Action dated Mar. 29, 2012 cited in Appln No. 1560-2010.
Chilean Office Action dated Mar. 29, 2012 cited in Appln No. 1559-2010.
India First Examination Report dated Mar. 30, 2012 cited in Appln No. 1817/DEL/2005.
Japanese Notice of Allowance dated Apr. 11, 2012 cited in Appln No. 2008-530229.
U.S. Official Action dated Apr. 5, 2012 in U.S. Appl. No. 12/163,758.

(56) References Cited

OTHER PUBLICATIONS

U.S. Official Action dated Apr. 19, 2012 in U.S. Appl. No. 13/102,633.
Aoyagi, Hideo, "Mail Mac Fan Special 33"; Manichi Communications Inc., Mar. 1, 2004, 5 pgs.
Morita, Utako; "Literature Searching System, 'JDream'"; Online Search; vol. 23, No. 4; The Society of Japan Terminal, Dec. 2002; 5 pgs.
Milstein, Sarah; "The Missing Manual: The book that should have been in the box", First Edition; O'Reilly Japan, Inc.; Nov. 25, 2004; 1 pg.
Cole; "New Arrival! Forefront of Downloading"; Mac People; vol. 11, No. 10; ASCII Corporation; Aug. 31, 2005; 1 pg.
Sada, Morihiro; "Clue for Managing Common Data Filed on Server"; Business Personal Computer Age; vol. 15, No. 7; Dempa Publications, Inc.; Jul. 1, 1997; 1 pg.
Japanese Notice of Rejection dated Nov. 25, 2011 cited in Appln. No. 2008-531249.
Malaysian Substantive Examination Adverse Report dated Jan. 31, 2012 cited in Appln No. PI 20053258.
Malaysian Substantive Examination Adverse Report dated Jan. 31, 2012 cited in Appln No. PI 20053259.
European Search Report dated Feb. 23, 2012 cited in Appln No. 05107153.8.
Chinese Office Action dated Feb. 29, 2012 cited in Appln No. 200980124664.9.
Chinese Decision on Rejection dated Mar. 7, 2012 cited in Appln No. 200780020312.7.
Chinese Second Office Action dated Mar. 9, 2012 cited in Appln No. 200980124383.0.
Japanese Notice of Final Rejection dated Mar. 9, 2012 cited in Appln No. 2008-513476.
U.S. Official Action dated Feb. 27, 2012 in U.S. Appl. No. 12/372,386.
U.S. Official Action dated Mar. 14, 2012 in U.S. Appl. No. 12/142,927.
Korean Notice of Rejection dated Nov. 3, 2011 cited in Appln No. 10-2005-0067257.
Japanese Notice of Rejection dated Nov. 11, 2011 cited in Appln. No. 2008-530229.
Chinese Office Action dated Nov. 18, 2011 cited in Appln. No. 200910148820.4.
Chinese Office Action dated Nov. 29, 2011 cited in Appln. No. 200980124383.0.
Chinese Third Office Action dated Dec. 5, 2011 cited in Appln. No. 200680018095.3.
U.S. Official Action dated Oct. 25, 2011 in U.S. Appl. No. 12/144,642.
Yang, "Email Categorization Using Fast Machine Learning Algorithms", 2002, 8 pgs.
Islam et al., "Email Categorization Using Multi Stage Classification Technique", 2007, 3 pgs.
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
Australian OA dated Jan. 17, 2011 cited in Application No. 2006287408.
Chinese Second Office Action dated Apr. 7, 2011 cited in Application No. 200680032789.2, w/translation.
Japanese Office Action dated Jun. 10, 2011 cited in JP Application No. 2008-530229, w/translation.
Chinese Third Office Action dated Jun. 21, 2011 cited in Appln No. 200680030421.2.
Chinese Second Office Action dated Jul. 14, 2011 cited in Appln No. 20680018095.3.
Chinese Decision on Rejection dated Jul. 21, 2011 cited in Appln No. 20068032789.2.
U.S. Official Action dated Oct. 5, 2009 in U.S. Appl. No. 11/332,822.
U.S. Official Action dated Apr. 23, 2010 in U.S. Appl. No. 12/144,642.
U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jun. 7, 2011 in U.S. Appl. No. 11/332,822.
U.S. Official Action dated Jul. 8, 2011 in U.S. Appl. No. 11/401,470.
U.S. Official Action dated Jul. 8, 2011 in U.S. Appl. No. 12/163,784.
U.S. Official Action dated Aug. 3, 2011 in U.S. Appl. No. 12/142,927.
Korean Notice of Rejection dated Jan. 30, 2012 cited in Appln No. 10-2004-0048176.
Japanese Notice of Rejection dated Feb. 3, 2012 cited in Appln No. 2008-530218.
U.S. Official Action dated Jan. 26, 2012 in U.S. Appl. No. 12/464,584.
The Discussion Board Component of Blackboard: An Instructor's Guide; Aug. 2004; 23 pgs.
Hock, "Yahoo! To the Max"; May 10, 2005; 5 excerpted pgs.
Homeworking Forum; archived Dec. 6, 2004; 11 pgs.
Gina Danielle Venolia et al., Supporting Email Workflow, revised Dec. 2001; 11 pgs.
Mock et al., "An Experimental Framework for Email Categorization and Management", Sep. 9-12, 2001, 3 pgs.
Mexican Office Action dated Oct. 3, 2011 cited in Appln. No. MX/a/2008/014849.
U.S. Official Action dated Nov. 2, 2011 cited in U.S. Appl. No. 10/836,154.
Dr. Dobb's Journal; "Windows 95 Common Controls"; May 1, 1995; 12 pgs.
Mexican Office Action Summary, dated Sep. 22, 2011 cited in Appln. No. MX/A/2008/003342.
Japanese Notice of Rejection dated Nov. 4, 2011 cited in Appln No. 2008-513476.
European Search Report dated Dec. 6, 2011 cited in Appln No. 06803424.8.
Japanese Notice of Rejection dated Dec. 16, 2011 cited in Appln No. 2008-529218.
U.S. Official Action dated Jan. 12, 2012 cited in U.S. Appl. No. 11/782,059.
U.S. Appl. No. 13/615,668, filed Sep. 14, 2012 entitled "User Interface for Displaying Selectable Software Functionality Controls that are Relevant to a Selected Object".
Malaysian Examination Report dated Aug. 30, 2012 in Appln No. PI 20080400.
Chinese Second Office Action dated Sep. 12, 2012 in Appln No. 200980124944.7.
Mexican Office Action Summary dated Sep. 18, 2012 in Appln No. MX/a/2008/003342.
Chilean Office Action dated Sep. 21, 2012 cited in Appln No. 1560-2010, w/English Language Summary.
EP Communication dated Sep. 26, 2012 cited in Appln No. PCT/US2006/034993.
EP Search Report dated May 10, 2013 cited in Appln No. PCT/US2009/044292.
Russian Office Action dated May 13, 2013 cited in Appln No. 2010-151922.
Korean Final Notice of Preliminary Rejection dated May 20, 2013 cited in Appln No. 10-2008-7005939.

(56) References Cited

OTHER PUBLICATIONS

Chinese Notice on Third Office Action dated Jun. 5, 2013 cited in Appln No. 200980124644.9.
Mexican Office Action dated Jun. 11, 2013 in Appln No. PA/a/2005/008351.
Mexican Office Action dated Jun. 20, 2013 in Appln No. MX/a/2010-014056.
U.S. Official Action dated Jun. 3, 2013 in U.S. Appl. No. 13/102,622, 29 pgs.
U.S. Official Action dated Jul. 23, 2013 in U.S. Appl. No. 11/782,059, 35 pgs.
U.S. Official Action dated Jul. 24, 2013 in U.S. Appl. No. 12/142,927, 42 pgs.
U.S. Appl. No. 13/925,523, filed Jun. 24, 2013 entitled "Communication Between a Document Editor-in-Space User Interface and a Document Editor Out-Space User Interface", Dukhon et al.
Microsoft Press, Microsoft Computer Dictionary, Microsoft Press, Fifth Edition, 2002, pp. 374, 382.
"Look and Layout", retrieved at <<http://liv.ac.uk/csd/email/outlook/layout.htm>>, University of Liverpool, retrieved Mar. 3, 2008, 9 pgs.
"Reading Pane in Conversation View", retrieved at <<http://www.zimbra.com/forums/users/5918-reading-pane-conversation-view.html>>, retrieved Mar. 3, 2008, 5 pgs.
Mexican Office Action dated Jan. 22, 2013 cited in Appln No. MX/a/2008/003342.
Mexican Office Action dated Mar. 22, 2013 in Appln No. PA/a/2005/008350.
Mexican Office Action dated Sep. 27, 2013 in Appln No. MX/a/2008/014849.
EP Communications to Attend Oral Proceedings dated Oct. 10, 2013 in Appln No. 09 006 972.5.
Korean Notice of Preliminary Rejection dated Nov. 12, 2012 cited in KR-10-2008-7005939.
Chilean Second Office Action dated Nov. 21, 2012 cited in Appln No. 1559-2010.
Canadian Office Action dated Nov. 23, 2012 cited in Appln No. 2,512,102.
Canadian Office Action dated Nov. 29, 2012 cited in Appln No. 2,512,047.
U.S. Official Action dated Oct. 24, 2012 in U.S. Appl. No. 13/102,633.
U.S. Official Action dated Nov. 23, 2012 in U.S. Appl. No. 11/782,059.
U.S. Official Action dated Dec. 5, 2012 in U.S. Appl. No. 12/777,287.
Israeli Office Action dated Jun. 18, 2013 cited in Appln No. 170668.
EP Communication dated Jul. 17, 2013 in Appln No. EP 07 795 391.7.
Chinese Second Office Action dated Aug. 5, 2013 in Appln No. 201080021957.4.
Russian Decision on Grant dated Aug. 12, 2013 in Appln No. 2010151922/08.
U.S. Official Action dated Aug. 2, 2013 in U.S. Appl. No. 12/777,287, 47 pgs.
U.S. Official Action dated Aug. 14, 2013 in U.S. Appl. No. 11/332,822, 102 pgs.
U.S. Official Action dated Aug. 19, 2013 in U.S. Appl. No. 10/851,506, 24 pgs.
U.S. Official Action dated Aug. 30, 2013 in U.S. Appl. No. 12/574,256, 31 pgs.
U.S. Official Action dated Sep. 6, 2013 in U.S. Appl. No. 12/028,797, 113 pgs.
U.S. Appl. No. 13/769,598, filed Feb. 18, 2013 entitled "Automatic Conversation Techniques".
Malaysian Substantive Examination Report dated Oct. 31, 2012 cited in Appln No. PI 20053260, 2 pgs.
Malaysia Substantive Examination Adverse Report dated Jan. 15, 2013 in Appln No. PI 20084401, 3 pgs.
EP Search Report dated Jan. 30, 2013 in Appln No. PCT/US2009/044059, 8 pgs.
Mexican Office Action dated Feb. 25, 2013 in Appln No. MX/a/2008/002889, 11 pgs.
U.S. Official Action dated Mar. 1, 2013 in U.S. Appl. No. 11/430,562, 66 pgs.
U.S. Appl. No. 13/595,084, filed Aug. 27, 2012 entitled "Command User Interface for Displaying Selectable Software Functionality Controls".
Mexican Office Action Summary dated Jun. 25, 2012 in Appln No. PA/a/2005/008354.
Korean Notice of Preliminary Rejection dated Jul. 2, 2012 cited in Appln No. 10-2012-0024393.
Korean Notice of Preliminary Rejection dated Jul. 19, 2012 cited in Appln No. 10-2007-7024571.
Chinese Third Office Action dated Aug. 14, 2012 in Appln No. 200980124383.0.
U.S. Official Action dated Aug. 7, 2012 in U.S. Appl. No. 10/836,154.
Ohmori, Yasuo et al., "Eigyo Mind—A Sales Support Tool," PFU Tech. Rev., vol. 10, No. 1, pp. 32-38, PFU Limited, May 1, 1999, (cited in Aug. 12, 2011 JP Notice of Rej.).
Mexican Office Action dated May 26, 2011 cited in Appln. No. MX/a/2009/004151.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
U.S. Official Action dated Sep. 13, 2011 in U.S. Appl. No. 12/372,386.
U.S. Official Action dated Sep. 14, 2011 in U.S. Appl. No. 12/163,758.
Seo et al, "Hangul Office 2000 Tutoring Book", Sep. 15, 2000, 16 pgs. (Cited in Korean Notice of Rejection May 17, 2011).
Office 2007, Microsoft, Released on Nov. 6, 2006, 23 pgs. (Cited in 1275us01 Jun. 9, 2011 OA).
Mexican Office Action dated Jan. 6, 2011 cited in Appln No. PA/a/2005/008354.
Mexican Office Action dated Mar. 31, 2011 cited in Appln No. PA/a/2005/008351.
Mexican Office Action dated Mar. 31, 2011 cited in Appln No. PA/a/2005/008349.
Mexican Office Action dated Mar. 31, 2011 cited in Appln No. PA/a/2005/008350.
Korean Notice of Rejection dated May 17, 2011 cited in Appln No. 10-2004-48176.
Russian Office Action dated Jun. 14, 2011 cited in Appln No. 2008147090.
U.S. Official Action dated Jun. 9, 2011 in U.S. Appl. No. 12/464,584.
U.S. Appl. No. 13/102,633, filed May 6, 2011 entitled "Markup Based Extensibility for User Interfaces".
Philippines Examiner's Action dated Apr. 12, 2011 cited in Appln No. 1-2005-00404.
Japanese Notice of Rejection dated May 6, 2011 cited in Appln. No. 2005-236089.
Japanese Notice of Rejection dated May 6, 2011 cited in Appln. No. 2005-236087.
Chinese Second Office Action dated May 19, 2011 cited in Appln No. 200780020312.7.

(56) References Cited

OTHER PUBLICATIONS

U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
U.S. Official Action dated May 19, 2011 in U.S. Appl. No. 10/851,506.
Israeli Office Action dated Oct. 28, 2010 cited in Appln No. 169716.
U.S. Official Action dated Dec. 8, 2010 in U.S. Appl. No. 10/851,506.
U.S. Official Action dated Dec. 8, 2010 in U.S. Appl. 10/955,967.
U.S. Official Action dated Dec. 16, 2010 in U.S. Appl. 11/430,562.
U.S. Official Action dated Dec. 20, 2010 in U.S. Appl. 11/445,393.
U.S. Official Action dated Dec. 29, 2010 in U.S. Appl. 12/028,787.
U.S. Official Action dated Jan. 5, 2011 in U.S. Appl. 11/823,999.
U.S. Appl. No. 12/954,952, filed Nov. 29, 2010 entitled "Gallery User Interface Controls".
Bellavista et al., "A Mobile Infrastructure for Terminal, User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
U.S. Official Action dated Nov. 22, 2010 in U.S. Appl. 11/782,059.
U.S. Official Action dated Nov. 26, 2010 in U.S. Appl. 12/753,923.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Chinese Second Office Action dated Oct. 29, 2010 cited in Appln No. 200680030421.2.
U.S. Appl. No. 10/955,967, Notice of Allowance mailed Apr. 10, 2012, 18 pages.
U.S. Appl. No. 12/372,386 Notice of Allowance mailed Mar. 10, 2015, 3 pages.
U.S. Appl. No. 12/372,386, Notice of Allowance mailed Mar. 23, 2015, 5 pages.
U.S. Appl. No. 13/427,939, Office Action mailed Sep. 13, 2016, 13 pgs.
U.S. Appl. No. 14/032,094, Notice of Allowance mailed Sep. 30, 2016, 9 pgs.
Walther, Henrik, "Using Search Folders in Outlook 2003", retrieved at: http://www.outlookexchange.com/articles/henrikwalther/using_search_folders_in_outlook_2003.asp, published Jan. 2004, obtained Sep. 28, 2016, 5 pgs.
U.S. Appl. No. 11/332,822, Notice of Allowance mailed Sep. 14, 2016, 2 pgs.
Yaser, "Microsoft Office Word 2003", Retrieved from: <<http://www.just.edu.jo/~yaser/courses/cs98/slides/Microsoft%20Office%20Word%202003.ppt>>, 2003, 49 Pages.
Word 2003 Introduction, Retrieved from: <<http://www.photoshoplondon.com/www/training-manuals/Word2003Intro.pdf>>, The Mouse Training Company, Sep. 9, 1999, 166 Pages.
Canadian Office Action Issued in Patent Application No. 2724681, Mailed Date: Apr. 15, 2016, 5 Pages.
Canadian Office Action Issued in Patent Application No. 2848700, Mailed Date: May 2, 2016, 4 Pages.
Malaysian Substantive Examination Adverse Report in Application PI 2011004990, mailed Mar. 15, 2016, 3 pgs.
U.S. Appl. No. 14/226,421, Office Action mailed May 6, 2016, 18 pgs.
U.S. Appl. No. 14/150,531, Office Action mailed May 20, 2016, 22 pgs.
U.S. Appl. No. 13/427,939, Office Action mailed May 25, 2016, 18 pgs.
U.S. Appl. No. 11/332,822, Notice of Allowance mailed Jul. 6, 2016, 9 pgs.
U.S. Appl. No. 14/032,094, Notice of Allowance mailed Jun. 24, 2016, 8 pgs.
European Office Action in Application 05107186.8, mailed Jul. 27, 2016, 6 pgs.
European Office Action in Application 05107153.8, mailed Jul. 22, 2016, 6 pgs.
Canadian Notice of Allowance in Application 2750422, mailed Mar. 10, 2016, 1 page.
Chilean Notice of Allowance in Application 201101987, mailed Mar. 30, 2016, 2 pgs; (w/o English translation).
Korean Office Action in Patent Application No. 10-2011-7018813, mailed Jul. 29, 2016, 3 pgs; w/o English translation).
U.S. Appl. No. 14/142,132, Notice of Allowance mailed Aug. 3, 2016, 17 pgs.
U.S. Appl. No. 11/332,822, Amendment and Response filed Aug. 11, 2016, 7 pgs.
U.S. Appl. No. 14/226,421, Amendment and Response filed Aug. 5, 2016, 8 pgs.
U.S. Appl. No. 13/925,523, Office Action mailed Aug. 2, 2016, 7 pgs.
U.S. Appl. No. 13/615,668, Amendment and Response filed Jun. 2, 2016, 12 pgs.
U.S. Appl. No. 14/032,094, Notice of Allowance mailed Aug. 9, 2016, 2 pgs.
U.S. Appl. No. 13/427,939, Amendment and Response filed Aug. 3, 2016, 14 pgs.
U.S. Appl. No. 12/028,797, Notice of Allowance mailed Feb. 27, 2015, 14 pgs.
Canadian Office Action in Application 2512155, mailed Aug. 26, 2016, 4 pgs.
Chilean Office Action in Application 200501770, mailed Sep. 2, 2016, 2 pgs. (no English translation).
Chilean Office Action in Application 200501769, mailed Sep. 2, 2016, 2 pgs. (no English translation).
U.S. Appl. No. 11/332,822, Notice of Allowance mailed Aug. 26, 2016, 9 pgs.
U.S. Appl. No. 14/226,421, Notice of Allowance mailed Aug. 31, 2016, 7 pgs.
U.S. Appl. No. 13/615,668, Office Action mailed Sep. 1, 2016, 18 pgs.
Canada Notice of Allowance Issued in Patent Application No. 2,848,667, mailed Oct. 6, 2015, 1 Page.
Canadian Notice of Allowance Issued in Patent Application No. 2,512,047, mailed Oct. 2, 2014, 1 Page.
Chile Office Action Issued in Patent Application No. 1770-2005, mailed Feb. 9, 2010, 7 Pages. (W/out English translation).
Chile Office Action Issued in Patent Application No. 1770-2005, mailed Mar. 13, 2009, 10 Pages, with English translation.
Chilean Office Action in Appln. No. 2005-01769, mailed Jul. 15, 2005, 11 pgs. (with English translation).
Chinese Notice of Allowance Issued in Patent Application No. 200510092142.6, mailed Jun. 18, 2010, 4 Pages.
Communication Pursuant to Rule 69 EPC Issued in European Patent Application 051071513.8, Mailed Date: Apr. 2, 2012, 1 Page.
Egyptian Office Action Issued in Patent Application No. 3712005, mailed Apr. 9, 2010, 4 Pages.
European Office Action in Appln. No. 05107157.9, mailed Jul. 20, 2016, 6 pgs.
European Office Action Issued in Patent Application 05107153.8, Mailed Date Apr. 2, 2012, 1 Page.
European Search Report Issued in Patent Application No. 09727331.2, mailed Aug. 1, 2014, 1 Page.
Fifth Office Action Issued in Chinese Patent Application 200980112454.5, Mailed Date: Apr. 2, 2014, 19 Pages.
First Office Action Issued in Chinese Patent Application 200980112454.5, Mailed Date: Aug. 26, 2011, 9 Pages.
Furman, et al., "Positioning HTML Elements with Cascading Style Sheets", W3C Working Draft, Aug. 19, 1997, 14 Pages.
Gajos, et al., "Supple: Automatically Generating User Interfaces", In Proceedings of the 9th International Conference on Intelligent User Interfaces, Jan. 13, 2004, pp. 1-8.
Israel Office Action in Application 169718, mailed Oct. 17, 2013, 4 pages. (with English translation).

(56) References Cited

OTHER PUBLICATIONS

Israel Office Action in Application 233533, mailed May 31, 2016, 2 pgs. (W/out English Translation).
Israel Office Action Issued in Patent Application No. 169717, mailed Oct. 26, 2009, 2 Pages.
Jacobs, et al., "Adaptive Grid-Based Document Layout", In Proceedings of ACM transactions on Graphics, SIGGRAPH 2003, vol. 22, Issue 3, Jul., 2003, 11 Pages.
Japanese Notice of Allowance Issued in Patent Application No. 2005-236089, mailed Aug. 23, 2011, 6 Pages.
Japanese Office Action Issued in Patent Application No. 2005-236089, mailed Sep. 20, 2011, 2 Pages.
Kim, et al., "Migrating Legacy Software Systems to CORBA based Distributed Environments through an Automatic Nrapper Generation Technique", In Proceedings SCI 2000 and the 6th International Conference on Information Systems Analysis and Synthesis Isas 2000, vol. 10, Aug. 9, 2001, 6 Pages.
Korean Notice of Allowance Issued in Patent Application No. 10-2005-0067411, mailed Mar. 12, 2012, 2 Pages. (Without English Translation).
Louw, et al., "Extensible Web Browser Security", In Proceedings of the 4th International Conference on Detection of Intrusions and Malware, and Vulnerability Assessment, Jul. 12, 2007, 20 Pages.
Malaysian Notice of Allowance Issued in Patent Application No. PI20053258, mailed Oct. 15, 2012, 2 Pages.
Mexican Notice of Allowance Issued in Patent Application No. PA/a/2005/008349, mailed Dec. 16, 2014, 1 Page. (No English translation).
New Zealand Application No. 541299, Examination Report dated Nov. 8, 2006, 1 page.
Non-Final Office Action Issued in U.S. Appl. No. 10/780,547, Mailed Date: Oct. 4, 2007, 16 Pages.
Norway Notice of Allowance Issued in Patent Application No. 20053656, mailed Jun. 22, 2015, 2 Pages. (W/out English Translation).
Norway Office Action dated Sep. 15, 2015 in Appln. No. 20053658, 1 page (no English translation).
Norway Office Action Issued in Patent Application No. 20053656, mailed Feb. 22, 2014, 5 Pages.
Office Action Issued in Mexican Patent Application No. MX/a/2011/008461, Mailed Date: May 19, 2016, 10 Pages. (No English Translation).
Office Action Issued in Philippines Patent Application 1200500404, Mailed Date: Apr. 12, 2011, 1 Page
Office Action Issued in Russian Patent Application 200512583709, Mailed Date: Oct. 30, 2009, 5 Pages. (English translation).
Parry, Dominic Charles, "Crews: A Component-Driven, Run-Time Extensible Web Service Framework", In Thesis Submitted in fulfilment of the requirements for the Degree of Master of Science, Rhodes University, Dec. 2003, 103 Pages.
Philippines Office Action Issued in Patent Application No. PH12005405, mailed Jan. 19, 2006, 1 Page.
Russian Notice of Allowance Issued in Patent Application No. 2005125837, mailed Jul. 10, 2010, 23 Pages.
Selca, et al., "Customizing the Office Fluent User interface in Access 2007", Retrieved from <<http://msdn.microsoft.com/en-us/library/bb187398(printer).aspx>>, Dec. 2006, 22 Pages.
Shih, et al., "A Stepwise Refinement Approach to Multimedia Presentation Designs", In IEEE International Conference on Systems, Man, and Cybernetics Computational Cybernetics and Simulation, vol. 1, Oct. 12, 1997, pp. 117-122.
Shinder, Deb, "Locate and organize e-mail messages with Outlook 2003 search folders", retrieved at: http://www.techrepublic.com/article/locate-and-organize-e-mail-messages-with-outlook-2003-search-folders/, Aug. 5, 2004, obtained Sep. 28, 2016, 12 pgs.
Supplementary Search Report Issued in European Patent Application 09727331.2, Mailed Date: Jul. 16, 2014, 6 Pages.
Supplementary Search Report Issued in European Patent Application 09767220.8, Mailed Date: Jan. 30, 2013, 8 Pages.
Supplementary Search Report Issued in European Patent Application 09798374.6, Mailed Date: May 10, 2013, 6 Pages.
Taiwan Notice of Allowance Issued in Patent Application No. 102112935, Mailed Aug. 31, 2015, 4 Pages.
Taiwan Notice of Allowance Issued in Patent Application No. 94123640, mailed Mar. 12, 2013, 4 Pages. (with English translation).
Taiwan Notice of Allowance Issued in Patent Application No. 98145363, mailed Aug. 13, 2015, 4 Pages.
Thailand Notice of Allowance in Application 0501003162, mailed Sep. 13, 2016, 1 page. No English translation.
U.S. Appl. No. 10/780,547, Office Action mailed Jun 14, 2007, 6 Pages.
U.S. Appl. No. 10/800,056, Advisory Action mailed Feb. 14, 2007, 3 pgs.
U.S. Appl. No. 14/981,404, filed Dec. 28, 2015 entitled "Command User Interface for Displaying Selectable Software Functionality Controls".
Inoue, Risako, "Learn from Demonstration How to Use Power Point", In Nikkei PC21, Nikkei Business Publications, vol. 13, Issue 7, Apr. 1, 2008, pp. 168-171 (No English Translation provided) (cited in Oct. 21, 2015 JP OA).
Canadian Office Action Issued in Application No. 2,848,700, Mailed Date: Oct. 15, 2015, 4 Pages.
Japanese Office Action Issued in Patent Application No. 2014-163396, Mailed Date: Oct. 21, 2015, 5 Pages.
Canadian Office Action Issued in Patent Application No. 2,512,155, Mailed Date: Nov. 30, 2015, 7 Pages.
Chinese Fifth Office Action dated Dec. 16, 2015 in Appln No. 200910148820.4, 6 pgs.
Norway Office Action dated Jan. 22, 2016 in Appln No, 20054097, 1 pg.
Notice of Allowance dated Nov. 20, 2015 in U.S. Appl. No. 13/769,598, 15 pgs.
Official Action dated Jan. 4, 2016 in U.S. Appl. No. 13/615,668, 28 pgs.
U.S. Appl. No. 14/841,698, filed Aug. 31, 2015 entitled "Accessing an Out-Space User Interface a Document Editor Program".
Malaysia Substantive Examination Report dated Jun. 30, 2015 in Appln No. PI 2010005439, 2 pgs.
Canadian Office Action dated Aug. 3, 2015 in Appln No, 2,724,201, 5 pgs.
Korean Notice of Preliminary Rejection dated Sep. 30, 2015 in Appln No. 10-2010-7028097, 7 pgs.
Canadian Office Action dated Oct. 16, 2015 in Appln No. 2,724,681, 7 pgs.
Korean Notice of Preliminary Rejection dated Oct. 19, 2015 in Appln No. 10-2010-7028989, 7 pgs. (No English Language Translation).
U.S. Official Action dated Sep. 14, 2015 in U.S. Appl. No. 12/142,927, 31 pgs.
U.S. Official Action dated Oct. 1, 2015 in U.S. Appl. No. 13/427,939, 25 pgs.
U.S. Official Action dated Nov. 10, 2015 in U.S. Appl. No. 14/150,531, 31 pgs.
U.S. Appl. No. 14/665,112, filed Mar. 23, 2015 entitled "Hierarchically-Organized Control Galleries".
U.S. Appl. No. 14/635,605, filed Mar. 2, 2015 entitled "Command User Interface for Displaying Selectable Software Functionality Controls".
"Microsoft Office 2003 Editions Product Guide", Published on: Sep. 2003, Available at: tp://www.google.ca/url? sa=t&rct=j&g=&esrc=s&frm=1&source=web&cd=3&ved=0CCoQFjAC&url=http%3A%2Fdownload.microsoft.com%2Fdownload%2F0%2Ff%2F1%2F0f1d5b1f-53bc-47c3-bf6f-ac6d67cf9766%2FOffice2003Guide.doc&ei=CKTkVPBCgb-xBL6qgvAH&usg=AFQjCNEpNk4IFH6m27BXr481Kv1kRXo_xA, 167 pgs.
Baker; "Configuring the Pages Pane in Acrobat"; Apr. 22, 2004; Planet PDF; 4 pgs.
Murray; First Look 2007 Microsoft Office System; Jun. 21, 2006; Microsoft Press; 16 pgs.

(56) References Cited

OTHER PUBLICATIONS

Schwartz, Microsoft Office 2007 for Windows: Visual QuickStart Guide, 11 pgs.
Lyons et al., The Oval Menu-Evolution and Evaluation of a Wedget, © 1996; IEEE; 8 pgs.
Norwegian Office Action Received for Patent Application No. 20053656, Mailed Date: Nov. 19, 2014, 2 pgs.
Malaysian Substantive Examination Report dated Jan. 30, 2015 in Appln No. PI 2010005439, 3 pgs.
Malaysian Modified Substantive Examination Report dated Jan. 30, 2015 in Appln No. PI 2010005558, 3 pgs.
Chinese Fourth Office Action dated Feb. 15, 2015 in Appln No. 200780020312.7, 9 pgs.
U.S. Official Action dated Feb. 24, 2015 in U.S. Appl. No. 131769,598, 33 pgs.
U.S. Official Action dated Feb. 24, 2015 in U.S. Appl. No. 11/782,059, 37 pgs.
Notice of Allowance dated Mar. 19, 2015 in U.S. Appl. No. 13/464,572, 40 pgs.
U.S. Official Action dated Mar. 27, 2015 in U.S. Appl. No. 12/142,927, 68 pgs.
Notice of Allowance dated Apr. 16, 2015 in U.S. Appl. No. 13/595,084, 19 pgs.
U.S. Official Action dated Apr. 23, 2015 in U.S. Appl. No. 11/332,822, 40 pgs.
U.S. Official Action dated Apr. 29, 2015 in U.S. Appl. No. 13/427,939, 43 pgs.
Indonesian Office Action Issued in Patent Application No. P00200500444, Mailed Date: Jan. 16, 2015, 3 Pages. (w/o English Translation).
Chinese Third Office Action dated Feb. 2, 2015 in Appln No. 200910148820.4, 12 pgs.
Israeli Office Action Issued in Patent Application No. 213908, Mailed Date: Feb. 3, 2015, 3 pages. (w/o English Translation).
India Examination Report dated Feb. 17, 2015 in Appln No. 1568/DEL/2005, 3 pgs.
Canadian Office Action dated Feb. 19, 2015 in Appln No. 2,848,667, 5 pgs.
Canadian Office Action dated Feb. 19, 2015 in Appln No. 2,848,700, 4 pgs.
U.S. Appl. No. 12/142,927, Notice of Allowance mailed Jan. 9, 2017, 10 pgs.
U.S. Appl. No. 13/437,031, Office Action mailed Dec. 27, 2016, 8 pgs.
U.S. Appl. No. 13/615,668, Notice of Allowance mailed Jan. 9, 2017, 10 pgs.
U.S. Appl. No. 14/032,094, Notice of Allowance mailed Jan. 6, 2017, 9 pgs.
"2007 Microsoft Office System Is Golden", Microsoft News Center, Nov. 6, 2006, 23 Pages.
"User Interface Architecture", Retrieved from <<http://www.datamaster2003.com/uiarchitecture.htm>>, 2003, 2 Pages.
Australia Notice of Allowance Issued in Patent Application No. 2010216342, mailed Jun. 25, 2014, 2 Pages.
Australian Notice of Allowance Issued in Patent Application No. 2005203411, Mailed Date: Jul. 15, 2010, 3 Pages.
Barr, Jim, "Gmail Tips—The Complete Collection", Retrieved Date: Dec. 15, 2004, https://web.archive.org/web/20041215091758/http://g04.com/misc/GmailTipsComplete.html,18 pgs.
Bateman, et al., "Towards Constructive Text, Diagram, and Layout Generation for Information Presentation", in Association for Computational Linguistics, vol. 27, Issue 3, Sep. 2001, pp. 409-449.
Korean Notice of Allowance Issued in Application 10-2011-7026740, Mailed Date: Sep. 8, 2016, 2 Pages. (w/o English Translation).
European Notice of Allowance in Application 05107184.3, mailed Aug. 31, 2016, 7 pgs.
Taiwan Notice of Allowance in Appln No. 101133155, mailed Sep. 4, 2015, 4 pgs.
U.S. Appl. No. 11/332,822, Notice of Allowance mailed Nov. 8, 2016, 3 pgs.
U.S. Appl. No. 11/332,822, Notice of Allowance mailed Dec. 12, 2016, 2 pgs.
U.S. Appl. No. 14/150,531, Notice of Allowance mailed Nov. 29, 2016, 5 pgs.
U.S. Appl. No. 14/226,421, Notice of Allowance mailed Nov. 30, 2016, 8 pgs.
U.S. Appl. No. 13/925,523, Notice of Allowance mailed Dec. 6, 2016, 5 pgs.
Mexican Office Action Received in Patent Application No. MX/a/2010/013566, Mailed Dated: Jun. 12, 2013, 3 Pages.
Israeli Office Action Received in Patent Application No. 209011, Mailed Dated: Sep. 10, 2013, 5 Pages.
Chilean Office Action Received in Patent Application No. 2804-2011, Mailed Date: Apr. 4, 2014, 7 Pages. (w/o English Translation).
U.S. Official Action dated Sep. 10, 2014 in U.S. Appl. No. 12/954,952, 52 pgs.
U.S. Official Action dated Sep. 18, 2014 in U.S. Appl. No. 11/782,059, 41 pgs.
U.S. Official Action dated Sep. 30, 2014 in U.S. Appl. No. 13/595,084, 185 pgs.
U.S. Appl. No. 14/226,421, filed Mar. 24, 2014 entitled "Exposing Non-Authoring Features Through Document Status Information in an Out-Space User Interface".
"Create Office add-ins: ribbons, toolbars, taskpanes, menus etc.", http://www.add-in-express.com/creating-addins-blog/feed/, Jul. 4, 2007, 49 pgs. (added per B. Haslam, Jan 26, 2011, references cited from 7,802,199 Sep. 21, 2010 Patent).
"Look and Layout", retrieved at <<http://liv.ac.uk/csd/email/outlook/layout.htm, University of Liverpool, retrieved Mar. 3, 2008, 9 pgs.
"Preview Pane in Conversation: 4 pane view", 2005, Zinbra Inc., retrieved Mar. 3, 2008, 3 pgs.
"Reading Pane in Conversation View", retrieved at <<http://www.zimbra.conn/forurns/users/5918-reading-pane-conversation-view.html>>, retrieved Mar. 3, 2008, 5 pgs.
Inoue; "Let's Learn PowerPoint Using Actual Samples"; Nikkei PC21, Japan, Nikkei Business Publications, Inc., Apr. 1, 2008, vol. 13, No. 7, 5 pgs.—No English Translation.
Ramamritham et al., Scheduling Algorithms and Operating Systems Support for Real-Time Systems; © 1994; IEEE; 13 pages. (cited in May 7, 2014 NOA).
Zweben et al., Scheduling and Rescheduling with Iterative Repair, © 1993; IEEE; 9 pages. (cited in May 7, 2014 NOA).
Mexican Office Action dated Jun. 11, 2013 cited in Appln. No. MX/a/2008/003342.
Mexican Office Action dated Jul. 9, 2013 in Appln No. MX/a/2008/002889, 13 pgs.
Mexican Office Action dated Aug. 20, 2013 in Appln No. MX/a/2011/011749, 10 pgs.
Japanese Office Action dated Jan. 9, 2014 cited in JP Application No. 2012-510906 w/translation, 4 pgs.
Malaysian Substantive Examination Report dated Jan. 15, 2014 in Appln No. PI 20080508, 3 pgs.
EP Communication dated Jan. 27, 2014 in Appln No. 09 767 2208, 7 pgs.
Canadian Office Action dated Jan. 28, 2014 in Appln No. 2,511,101, 4 pgs.
Norway Office Action dated Feb. 10, 2014 in Appln No. 20053655, 4 pgs.
Norway Office Action dated Feb. 10, 2014 in Appln No. 20053658, 4 pgs.
EP Communication dated Feb. 11, 2014 cited in Appln No. 09 798 374.6, 6 pgs.
Mexican Office Action dated Feb. 11, 2014 cited in Appln No. MX/a/2008/003342, 8 pgs.
EP Communication on Decision to Refuse dated Feb. 20, 2014 cited in Appln No. 09 006 972.5, 15 pgs.
Australian Office Action dated Feb. 28, 2014 in Appln No. 2009262834, 3 pgs.
Australian Office Action dated Feb. 28, 2014 in Appln No. 2009262833, 3 pgs.

(56) References Cited

OTHER PUBLICATIONS

Australian Office Action dated Mar. 4, 2014 in Appln No. 2009260596, 4 pgs.
Australian Office Action dated Mar. 4, 2014 in Appln No. 2009271517, 3 pgs.
Taiwan Office Action dated Mar. 17, 2014 in Appln. No. 98118252, 10 pgs.
India First Examination Report dated Mar. 19, 2014 in Appln No. 1818/DEL/2005, 1 pg.
Chilean Office Action dated Mar. 30, 2014 in Appln No. 2804-2011, 7 pgs.
Chinese Third Office Action dated Apr. 3, 2014 in Appln No. 201080021957.4, 6 pgs.
Canadian Office Action dated Apr. 25, 2014 in Appln No. 2,512,155, 9 pgs.
Australian Second Office Action dated Apr. 29, 2014 in Appln No. 2009271517, 3 pgs.
Philippines Substantive Examination Report dated Apr. 30, 2014 cited in Appln No. 1-2008-500356, 1 pg.
Australian Office Action dated Apr. 30 2014 in Appln No. 2010247882, 3 pgs.
EP Search Report dated Jun. 2, 2014 in Appln No. PCT/US20101034277, 6 pgs.
U.S. Official Action dated Jan. 29, 2014 in U.S. Appl. No. 12/777,287, 44 pgs.
U.S. Official Action dated Feb. 26, 2014 in U.S. Appl. No. 12/954,952, 38 pgs.
U.S. Official Action dated Mar. 3, 2014 in U.S. Appl. No. 11/332,822, 38 pgs.
U.S. Official Action dated Mar. 4, 2014 in U.S. Appl. No. 12/142,927, 45 pgs.
U.S. Official Action dated Apr. 18, 2014 in U.S. Appl. No. 11/782,059, 42 pgs.
U.S. Official Action dated Apr. 25, 2014 in U.S. Appl. No. 12/028,797, 42 pgs.
U.S. Official Action dated May 14, 2014 in U.S. Appl. No. 13/615,668, 34 pgs.
U.S. Official Action dated May 30 2014 in U.S. Appl. No. 13/027,289, 188 pgs.
U.S. Official Action dated Jun. 2, 2014 in U.S. Appl. No. 12/144,642, 32 pgs.
U.S. Appl. No. 14/032,094, filed Sep. 19, 2013 entitled "User Interface for Displaying Selectable Software Functionality Controls that are Relevant to a Selected Object", Satterfield et al.
Canadian Office Action dated Sep. 18, 2013 in Appln No. 2,512,036.
Japanese Notice of Rejection dated Sep. 19, 2013 in Appln No. 2012-153634.
Canadian Office Action dated Oct. 7, 2013 in Appln No. 2,650,016.
Chilean Third Office Action dated Oct. 9, 2013 in Appln No. 2512-2005.
Israeli Office Action dated Oct. 17, 2013 cited in Appln No. 1611334.
India First Examination Report dated Oct. 21, 2013 cited in Appln No. 1017/DEL/2004.
Mexican Office Action dated Oct. 28, 2013 cited in Appln. No. MX/a/2010/013566.
Canadian Office Action dated Oct. 30, 2013 in Appln No. 2,512,047.
Korean Notice of Preliminary Rejection dated Nov. 7, 2013 cited in KR-10-2008-7029272.
Canadian Office Action dated Nov. 15, 2013 in Appln No. 2,512,102.
Chinese Third Office Action dated Dec. 4, 2013 in Appln No. 200680032789.2.
U.S. Official Action dated Nov. 8, 2013 in U.S. Appl. No. 13/615,668, 114 pgs.
U.S. Official Action dated Nov. 15, 2013 in U.S. Appl. No. 11/782,059, 33 pgs.
U.S. Official Action dated Nov. 29, 2013 in U.S. Appl. No. 12/144,642, 73 pgs.
Microsoft Office XP/2002, Wikipedia, http://en.wikipedia.org/wiki/Microsoft_Office_XP, May 31, 2001 (May 31, 2001); 3 pgs.
Akamatsu, "Touch with a Mouse, A Mouse Type Interface Device with Tactile and Force Display"; © IEEE; 1995; 5 pgs.
Israeli Office Action dated Mar. 6, 2014 in Appln No. 194785, 5 pgs.
India First Examination Report Issued in Patent Application No. 1820/DEL/2005, Mailed Date: Mar. 20, 2014, 1 Page.
Canadian Office Action dated Sep. 4, 2014 in Appln No. 2,512,036, 3 pgs.
Chinese Office Action dated Sep. 15, 2014 in Appln No. 201210079579.6, 11 pgs.
Canadian Office Action dated Sep. 30, 2014 in Appln No. 2,617,182, 3 pgs.
Israel Office Action Issued in Patent Application No. 169717, Mailed Date: Oct. 29, 2014, 1 Page; (w/o English Translation).
Chinese Decision on Reexamination dated Nov. 18, 2014 in Appln. No. 200910148820.4, 15 pgs.
U.S. Official Action dated Oct. 10, 2014 in U.S. Appl. No. 11/332,822, 47 pgs.
U.S. Official Action dated Oct. 24, 2014 in U.S. Appl. No. 13/615,668, 35 pgs.
U.S. Official Action dated Nov. 28, 2014 in U.S. Appl. No. 13/437,031, 100 pgs.
Ringel et al., "Automated Message Prioritization: Making Voicemail Retrieval More Efficient"; in CHI'02 Extended Abstracts on Human Factors in Computing Systems; Apr. 20, 2002; pp. 592-593.
Kumar et al., "A personal agent application for the semantic web"; in AAAI Fall Symposium on Personalized Agents; 2002; pp. 1-8.
Gorniak, Peter; "Sorting email messages by topic"; 1998; 1 pg.
Maes et al., "Learning Interface Agents"; in AAAI (vol. 93); 1993; pp. 459-465.
Russian Notice of Allowance Issued in Patent Application Number. 2010152843, Mailed Date: Feb. 20, 2014, 16 Pages.
Israeli Office Action dated Feb. 28, 2014 in Appln No. 209012, 6 pgs.
Mexican Office Action Received for Mexican Patent Application No. PA/a/2005/008349, Mailed Date: Mar. 14, 2014, Filed Date: Aug. 5, 2005, 12 Pages. (w/o English Translation).
Canadian Office Action dated Jul. 30, 2014 cited in Appln No. 2,512,155, 8 pgs.
Canadian Office Action dated Jul. 30, 2014 cited in Appln No. 2,512,102, 7 pgs.
Chinese Third Office Action dated Aug. 12, 2014 cited in Appln No. 200780020312.7, 13 pgs.
Mexican Office Action dated Aug. 14, 2014 cited in Appln No. PA/a/2005/008349, 18 pgs.
U.S. Official Action dated Aug. 25, 2014 in U.S. Appl. No. 13/102,633, 117 pgs.
U.S. Official Action dated Sep. 11, 2014 in U.S. Appl. No. 13/427,939, 133 pgs.
Israeli Office Action dated May 15, 2014 in Appln No. 209047, 6 pgs.
Israeli Office Action dated May 15, 2014 in Appln No. 209048, 15 pgs.
Canadian Office Action Issued for Patent Application No. 2618169, Mailed Date: Sep. 9, 2014, 4 pgs.
Taiwan Office Action and Search Report Issued in Patent Application No. 98145363, Mailed Date: Oct. 2, 2014, 25 Pages.
Chilean Office Action dated Oct. 24, 2014 in Appln No. 2804-2011, 5 pgs. (w/o English Translation).
Malaysian Substantive Examination Report dated Nov. 14, 2014 in Appln No. PI 2010005637, 3 pgs.
Norwegian Office Action dated Nov. 29, 2014 in Appln No. 20053658 4 pgs.
Norwegian Office Action dated Nov. 29, 2014 in Appln No. 20053655, 3 pgs.
India First Examination Report dated Dec. 23, 2014 in Appln No. 1819/del/2005, 2 pgs.
U.S. Official Action dated Dec. 24, 2014 in U.S. Appl. No. 13/102,633, 42 pgs.
U.S. Official Action dated Jan. 15, 2015 in U.S. Appl. No. 12/028,797, 47 pgs.

(56) References Cited

OTHER PUBLICATIONS

U.S. Appl. No. 12/142,927, Notice of Allowance mailed Jan. 30, 2017, 7 pgs.
U.S. Appl. No. 13/427,939, Notice of Allowance mailed Jan. 17, 2017, 9 pgs.
Canadian Office Action in Application 2848700, mailed Jan. 26, 2017, 4 pgs.
European Summons to Attend Oral Hearing in Application 05105584.6, mailed Jul. 22, 2016, 6 pgs.
Indian Office Action in Application 01489/DELNP/2008, mailed Aug. 31, 2015, 3 pgs.
Malaysian Notice of Allowance Received in Patent Application No. PI 20080400, Mailed Date: Sep. 13, 2013, Filed Date: Aug. 29, 2006, 2 Pages.
Notice of Allowance Received for Korea Republic of (KR) Patent Application No. 10-2008-7005939, Mailed Date: Nov. 20, 2013, Filed Date: Sep. 12, 2006, 2 Pages. (w/o English Translation).
Japanese Office Action Issued in Patent Application No. 2011-550149, Mailed Date: Jan. 20, 2014, Filed Date: Jan. 22, 2010, 5 Pages.
Australian Office Action Issued in Patent Application No. 2010216342, Mailed Date: Mar. 14, 2014, Filed Date: Jan. 22, 2010, 3 Pages.
Mexican Notice of Allowance Received in Patent Application No. MX/a/2008/002889, Mailed Date: Apr. 1, 2014, Filed Date: Aug. 29, 2006, 1 Page. (w/o English Translation).
Russian Notice of Allowance Issued in Patent Application No. 2011134380, Mailed Date: Apr. 5, 2014, Filed Date: Jan. 22, 2010, 22 Pages.
Australian Notice of Allowance Received for Australia Patent Application No. 2009262833, Mailed Date: Apr. 16, 2014, Filed Date: Jun. 5, 2009, 2 Pages.
Taiwan Search Report dated May 7, 2014 cited in Appln No. 098117357, 13 pgs.
Japanese Notice of Allowance Issued in Patent Application No. 2011-550149, Mailed Date: May 8, 2014, Filed Date: Jan. 22, 2010, 4 Pages.
Australian Second Office Action Issued in Patent Application No. 2010216342, Mailed Date: May 12, 2014, Filed Date: Jan. 22, 2010, 3 Pages.
Taiwan Search Report dated May 12, 2014 cited in Appln No. 098119245, 11 pgs.
Notice of Allowance Issued in Chinese Patent Application No. 200680032789.2, Mailed Date: May 15, 2014, Filed Date: Sep. 8, 2006, 3 Pages.
Russian Decision on Grant dated May 20, 2014 in Appln No. 2011145984/08, 24 pgs.
Japanese Final Decision of Rejection dated May 27, 2014 in Appln No. 2012-110939, 4 pgs.
EP Communication dated Jun. 2, 2014 in Appln No. 07 795 391.7, 9 pgs.
Chilean Second Office Action dated Jun. 6, 2014 in Appln No. 1987-2011, 12 pgs.
Russian Decision on Grant dated Jul. 20, 2014 in Appln No. 2010138162, 14 pgs.—No English Language Translation.
U.S. Official Action dated Jul. 1, 2014 in U.S. Appl. No. 12/372,386, 93 pgs.
U.S. Official Action dated Jul. 30, 2014 in U.S. Appl. No. 13/102,633, 36 pgs.
EP Communication dated Mar. 23, 2016 in Appln No. 06 790 087.8, 6 pgs.
European Extended Search Report in Application No. 10775348.5, mailed Jun. 2, 2014, 6 Pages.
Israeli Office Action Issued in Patent Application No. 221792, Mailed Date: Feb. 16, 2016, 4 pgs.
Korean Notice of Final Rejection in Application 10-2010-7028097, mailed Apr. 28, 2016, 4 pgs. (No English translation).
Korean Notice of Final Rejection in Application 10-2010-7028989, mailed Apr. 28, 2016, 4 pgs. (No English translation).
Korean Office Action in Application 10-2011-7026740, mailed Mar. 11, 2016, 4 Pages.
Malaysian Adverse Report in Application PI 2011003348, mailed Mar. 15, 2016, 3 pgs.
Norway Office Action dated in Appln No. 20053655, mailed Mar. 2, 2016, 3 pgs.
Notice of Allowance dated Mar. 15, 2016 in U.S. Appl. No. 14/032,094, 30 pgs.
U.S. Official Action dated Mar. 21, 2016 in U.S. Appl. No. 13/437,031, 41 pgs.
U.S. Appl. No. 14/032,094, Notice of Allowance mailed Apr. 18, 2016, 2 pgs.
U.S. Appl. No. 13/769,598, Notice of Allowance mailed Apr. 7, 2016, 4 pgs.
Korean Notice of Preliminary Rejection Issued in Patent Application No. 10-2011-7018813, Mailed Date: Jan. 8, 2016, 4 Pages.
U.S. Official Action dated Jan. 29, 2016 in U.S. Appl. No. 14/142,132, 149 pgs.
U.S. Appl. No. 12/142,927, Office Action mailed Apr. 7, 2016, 21 pgs.
U.S. Appl. No. 12/142,927, Notice of Allowance mailed Mar. 3, 2017, 2 pgs.
U.S. Appl. No. 13/615,668, Notice of Allowance mailed Feb. 21, 2017, 2 pgs.
U.S. Appl. No. 14/032,094, Notice of Allowance mailed Mar. 16, 2017, 2 pgs.
U.S. Appl. No. 13/427,939, Notice of Allowance mailed Feb. 9, 2017, 2 pgs.
U.S. Appl. No. 13/427,939, Notice of Allowance mailed Feb. 22, 2017, 3 pgs.
U.S. Appl. No. 14/226,421, Notice of Allowance mailed Mar. 13, 2017, 8 pgs.
U.S. Appl. No. 14/150,531, Notice of Allowance mailed Feb. 17, 2017, 5 pgs.
Korean Notice of Allowance in Application 9-5-2017-007518454, mailed Jan. 31, 2017, 2 pgs. (no English translation).
European Office Action in Application 06814334.6, mailed Jan. 31, 2017, 5 pgs.
U.S. Appl. No. 13/615,668, Notice of Allowance mailed Apr. 13, 2017, 2 pgs.
U.S. Appl. No. 14/032,094, Notice of Allowance mailed Apr. 13, 2017, 2 pgs.
U.S. Appl. No. 13/427,939, Notice of Allowance mailed Apr. 7, 2017, 2 pgs.
U.S. Appl. No. 14/150,531, Notice of Allowance mailed Apr. 19, 2017, 2 pgs.
U.S. Appl. No. 12/142,927, Notice of Allowance mailed May 3, 2017, 2 pgs.
U.S. Appl. No. 14/032,094, USPTO Reponses after Amendment after Allowance mailed Apr. 14, 2017, 2 pgs.
U.S. Appl. No. 14/635,605, Ex Parte Quayle Action mailed May 4, 2017, 8 pgs.
U.S. Appl. No. 13/615,668, USPTO Response to Amendment after Allowance mailed May 16, 2017, 2 pgs.
European Decision to Refuse and Minutes in Oral Proceeding in Application 05105584.6, mailed Mar. 28, 2017, 20 pgs.
Brazilian Office Action Issued in Patent Application No. PI0506116-4, mailed Apr. 20, 2017, 5 Pages. (with English Summary).

\* cited by examiner

SIDE-BY-SIDE SHARED CALENDARS

FIELD OF THE INVENTION

The present invention relates to methods and systems for creating and simultaneously displaying multiple shared electronic calendars in side-by-side orientation.

BACKGROUND OF THE INVENTION

Since the advent of the computer and software age, software developers have attempted to provide helpful functionality to software users that provide useful information in a contextual nature. One useful application is the electronic calendaring application where users may enter and view appointments and other scheduling data in an electronic calendar viewable on their computer display. Electronic calendars allow users to view calendar information in a variety of different modes such as hourly, daily, weekly, monthly, and the like, or portions of days, weeks, or months.

One useful aspect of electronic calendaring systems is the ability of users to share calendaring information across a distributed computing environment with other electronic calendar users. That is, one user may give permission to a number of other users to view his or her personal or business electronic calendar data. Accordingly, the first user may select a desired calendar of a friend or colleague and display the selected calendar using the first user's calendar application. Often, a user may wish to compare her calendar data to another user's calendar data to determine whether the second user is available for a meeting at a desired date and time period. In order to compare calendars, users must toggle between two or more calendars, or users may open two calendar windows on the same display. Unfortunately, because the second or other calendar may be presented in a different mode, for example, daily, weekly, monthly, etc., the first user has a difficult or unfriendly user experience at best.

Accordingly, there is a need for a method and system for presenting multiple shared calendars in a single common display window or frame where the multiple shared calendars are presented in common views and display modes. There is further a need for a method and system for allowing quick and efficient addition and removal of shared calendars from the multiple calendar view. It is with respect to these and other considerations that the present invention has been made.

SUMMARY OF THE INVENTION

Embodiments of the present invention provide methods and systems for presenting a plurality of shared calendars in a single electronic display frame or window where each of the plurality of shared calendars is displayed in a common view mode relative to other displayed shared calendars. According to an aspect of the invention, users may select one or more shared calendars to be displayed in the same display frame or window as their own calendar. Upon selection of a shared calendar to be displayed alongside a first calendar, an aggregate view object is called to control and coordinate all shared calendars selected for display in a common window or frame. The aggregate view object determines the view data object, including view mode (hourly, daily, weekly, monthly) and other calendar display settings of the first or active calendar displayed in the common view of shared calendars.

The aggregate view determines the available display space for displaying the first calendar plus selected additional shared calendars. The aggregate view determines the size and location for any selected incoming shared calendar. The aggregate view calls each selected shared calendar for displaying in the common view of shared calendars. The aggregate view next provides each called shared calendar with the view data object of the first calendar in order to display each shared calendar in the same view mode and settings as the first calendar. The aggregate view also provides each selected shared calendar with a location and size of display.

Once each selected shared calendar is called by the aggregate view, each selected shared calendar is displayed in a common view frame or window in side-by-side orientation where each displayed shared calendar is displayed in the same view mode (hourly, daily, weekly, monthly, etc.). Each date or time position of each displayed shared calendar is aligned with corresponding date or time positions of other displayed shared calendars.

According to one aspect of the invention, selection of any of the one or more displayed shared calendars establishes the selected calendar as the active calendar. If view mode or other display settings are changed in the active calendar, the aggregate view object causes the changes in the view mode or other display settings of the active calendar to be made to all displayed shared calendars in order to keep all shared calendars in a common view mode and with common display settings.

According to another aspect, navigation controls such as time bars and scroll bars are constructed by the aggregate view object for one of the plurality of displayed shared calendars to control all displayed shared calendars simultaneously so that, for example, scrolling one shared calendar scrolls all shared calendars simultaneously. Utilization of any controls or tools of the host calendaring application is applied to each displayed shared calendar.

According to another aspect of the invention, a navigation pane is provided including a date selection control and a shared calendar selection control. Selection of a date from the date selection control displays the selected date for all displayed shared calendars simultaneously. Selection of an additional shared calendar from the shared calendar selection control causes the aggregate view object to call the selected additional shared calendar to display the selected additional shared calendar along with presently displayed shared calendars. Likewise, deletion of a shared calendar from the selected displayed shared calendars causes the aggregate view object to dismiss the deleted calendar. Addition or deletion of a shared calendar results in resizing and repositioning of remaining or resulting shared calendars by the aggregate view object to utilize all available display space.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION OF THE PREFERRED EMBODIMENT

As briefly described above, embodiments of the present invention are directed to methods and systems for simultaneously displaying a plurality of shared electronic calendars in a single application window or frame where each displayed calendar is displayed in a common view mode in side-by-side orientation relative to each other. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
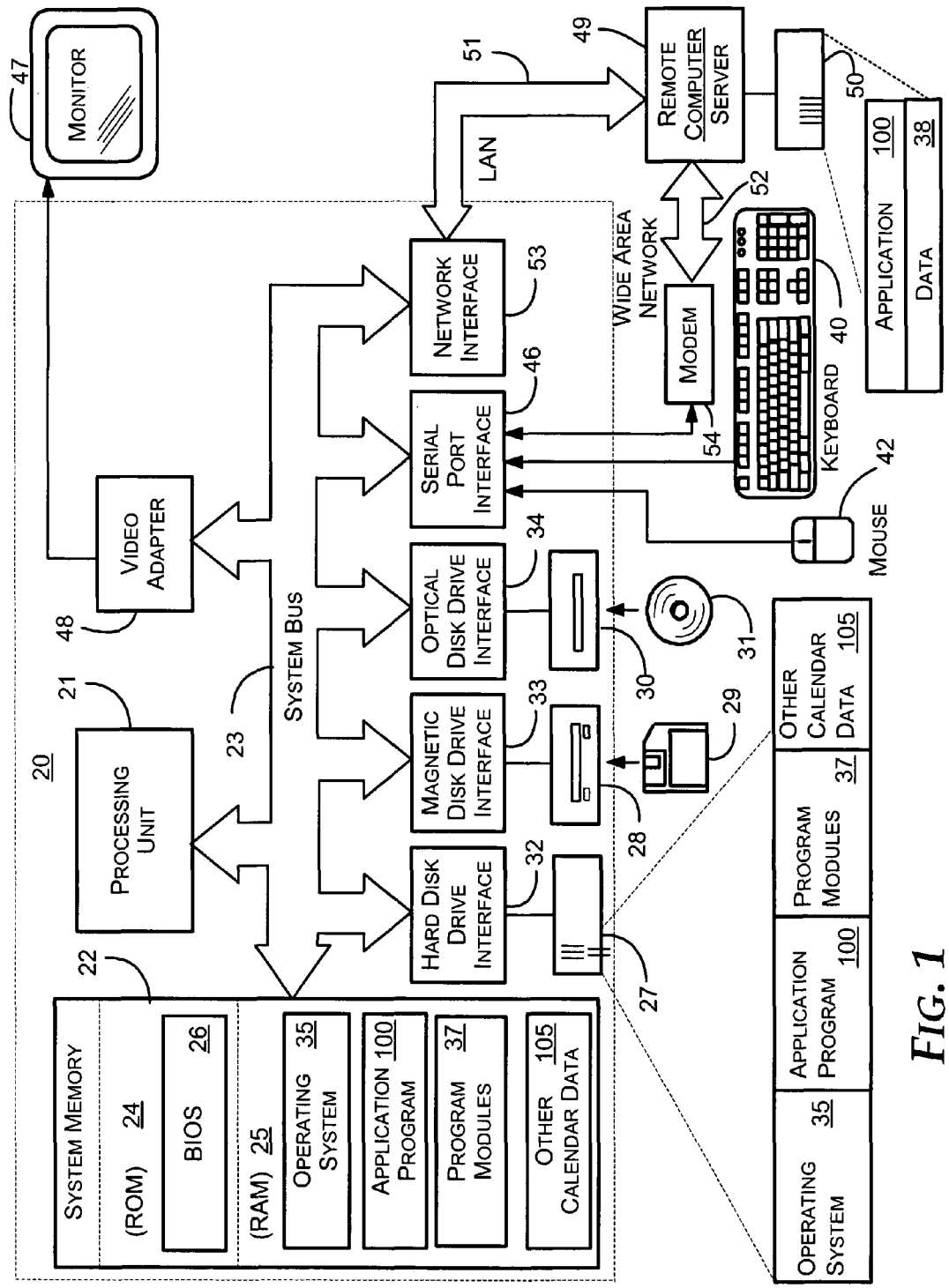
FIG. 1 is a block diagram showing the architecture of a personal computer that provides an illustrative operating environment for embodiments of the present invention.

Referring now to the drawings, in which like numerals represent like elements or components throughout the several figures, aspects of the present invention and the exemplary operating environment will be described. FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, such as a calendar application 200, described below. A word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
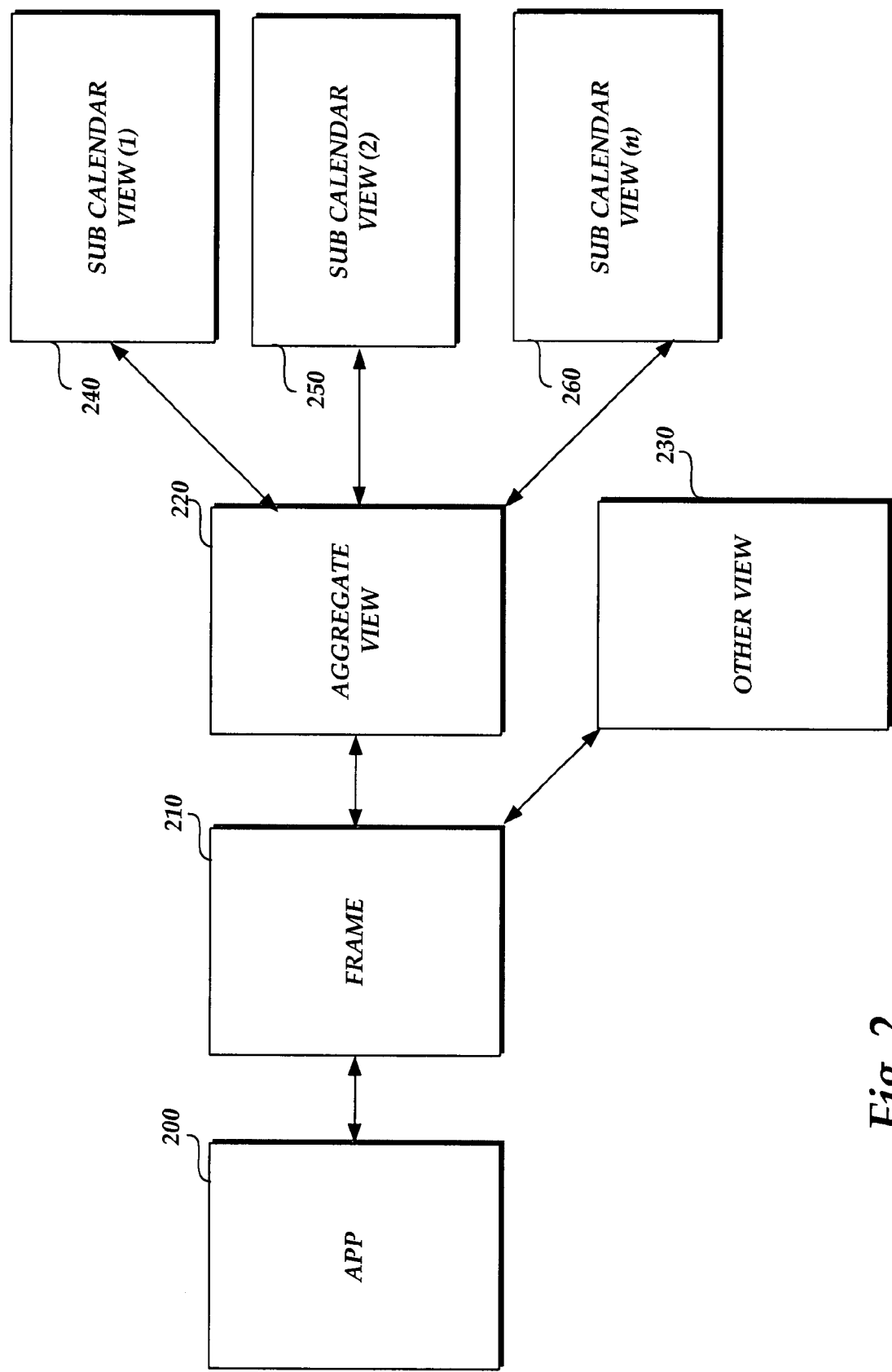
FIG. 2 is a simplified block diagram illustrating a relationship between a host calendar application, an aggregate view object and a plurality of selected shared calendars.

FIG. 2 is a simplified block diagram illustrating a relationship between a host calendar application, an aggregate view object and a plurality of selected shared calendars. According to embodiments of the present invention, a calendaring application 200, such as Outlook® manufactured by Microsoft Corporation of Redmond, Wash. provides a shared electronic calendar view whereby a plurality of shared electronic calendars are displayed to the user in a common view mode and side-by-side orientation relative to each other. It should be appreciated that the calendaring application 200 includes sufficient computer executable instructions for displaying a graphical user interface containing desired calendar information. A frame module 210 includes computer executable instructions for directing the display of user interface information on the user's display screen. For example, if the user of the calendaring application 200 selects the display of the user's calendar, the frame module 210 directs the placement, orientation and display of the calendaring information. Likewise, if the user selects the display of the user's contact information via the application 200, the frame module 210 directs the display of contact information for the user. In the case of calendar views, the frame module 210 provides a selected calendar view with an appropriate view data object including the view mode of the calendar such as hourly, weekly, daily, monthly, etc. and directs the positioning of other user interface components such as tool bars, navigation panes, and the like.

According to an embodiment of the present invention, in addition to directing the display of other views 230, such as contact information, the frame module 210 directs the activities of the aggregate view object module 220. As will be described in more detail below, the aggregate view module 220 is a software module integrated with the calendaring application 200 including sufficient computer executable instructions for directing the display of multiple selected subcalendar views 240, 250, 260 in a single view frame or window in side-by-side orientation. That is, according to embodiments of the present invention, a user may select a first calendar view 240, such as the user's own calendar, followed by selection of a second calendar view 250, followed by selection of multiple additional calendars up to N selected calendars 260. As will be described below with reference to FIG. 3, each selected calendar view is displayed by the aggregate view module 220 in side-by-side orientation in a single view frame or window.

Figure 3:
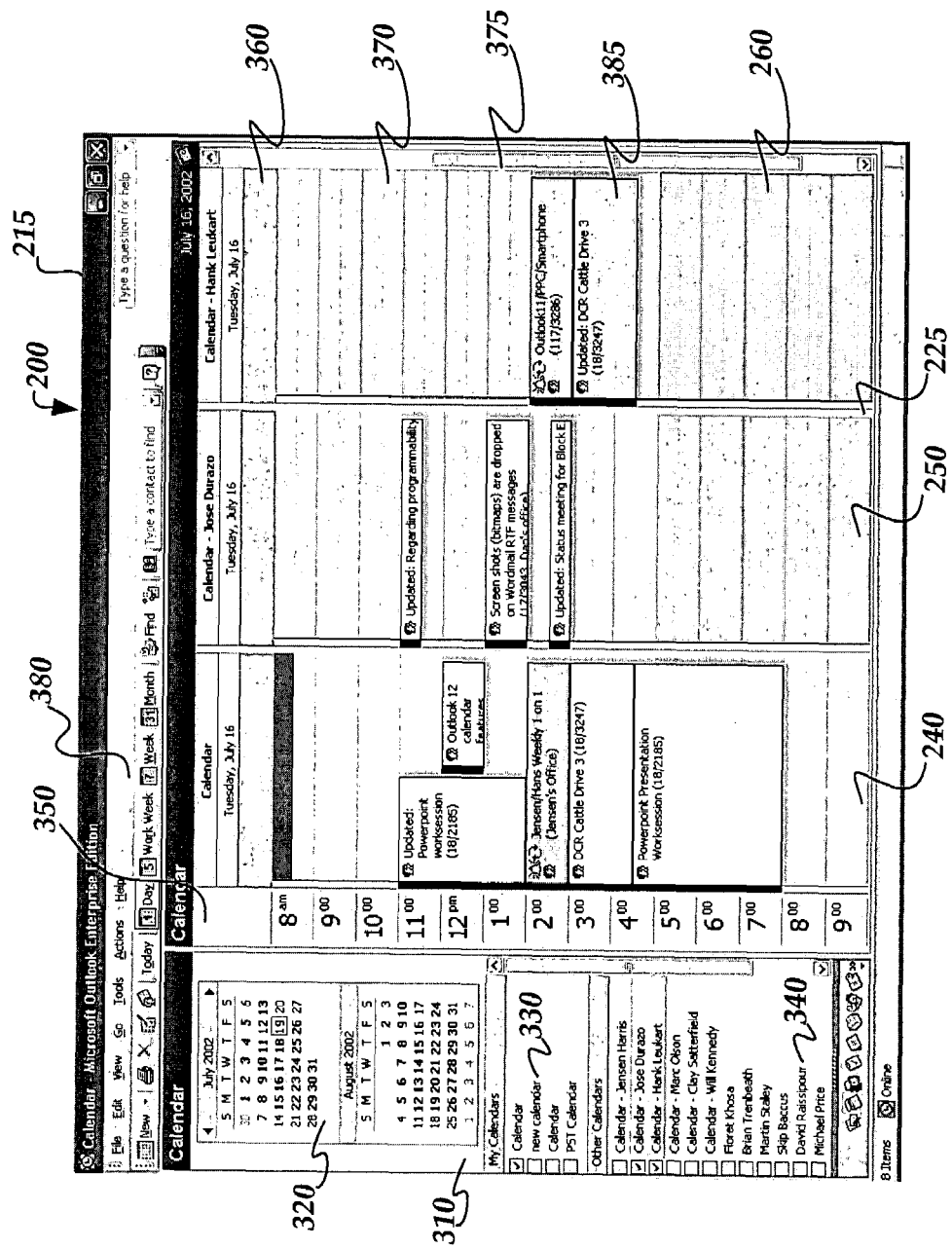
FIG. 3 illustrates a computer screen display showing an exemplary electronic calendar display showing the display of three shared calendars in a single and common display frame.

FIG. 3 illustrates a computer screen display showing an exemplary electronic calendar display showing the display of three shared calendars in a single and common display frame. As shown in FIG. 3, a calendaring application display frame 215 is illustrated. According to embodiments of the present invention, a plurality of selected calendar views 240, 250, 260 are displayed in a single view frame or window in side-by-side orientation. Also illustrated in FIG. 3 is the navigation pane 310 including a date selection control 320, a my-calendar selection control 330 and another calendars selection control 340. A time bar 350 is illustrated adjacent to the first calendar 240 and a scroll bar 375 is illustrated adjacent to the third calendar view to 260. A background color 370 is illustrated for each calendar view 240, 250, 260. A task pad (not shown) may also be provided for entering tasks applicable to a selected calendar. According to embodiments of the present invention the task pad accepts tasks for and is otherwise associated with the first selected calendar from which the view data object is obtained by the aggregate view module 220 for use with subsequently selected calendars.

Selection of any one of the shared calendars, such as by double clicking a mouse focus inside one of the display shared calendars, establishes the selected calendar as the active calendar. Subsequently, changes in the view mode of the active calendar cause like changes in the view modes of other displayed calendars. For example, if the first calendar 240 is established as the active calendar, and the user changes the first calendar 240 view mode from a single day in hourly increments to a weekly calendar, the calendar 240 will be changed to a weekly view mode, and the other displayed shared calendars 250, 260 will likewise be changed to a weekly view mode.

According to embodiments of the present invention, display of the shared calendars 250, 260 alongside the user's calendar 240 displays the data from those shared calendars under the control of the aggregate view module 220. Changes in the view mode, for example daily, weekly, monthly, etc., and changes in formatting such as font size of displayed calendaring data only makes those changes in the user's view of shared calendars. That is, if the owner of the data of a shared calendar, for example calendar 260, subsequently opens his or her calendar at his or her computer via a separate calendaring application 200, that user's calendaring data will be displayed according to the view mode, and other display settings selected by that user.

Additionally, date and time positions for each of the displayed shared calendars are kept in aligned orientation. For example, the 10:00 a.m. time position for the calendar 240 will be aligned in side-by-side orientation with the 10:00 a.m. time positions of the other displayed calendars 250, 260. Manipulation of date and time positions using controls such as the time bar 350 and the scroll bar 375 manipulates all displayed calendars 240, 250, 260 simultaneously. That is, scrolling the scroll bar 375 up or down scrolls all display calendars simultaneously while maintaining each date and time position of each displayed calendar in alignment, as described above. Generally, selection of tool bar functionality or navigation functionality affects all displayed calendars simultaneously. For example, changes in the font or other formatting of the active calendar, likewise changes the font or other formatting of other displayed calendars. Selection of a particular date from the date selection control 320 causes the display of the selected date in all displayed calendars 240, 250, 260.

As mentioned above, a my calendars selection control 330 and an other calendars selection control 340 are provided. Selection of one of the calendars provided in the my calendars selection control 330 causes the display of the selected calendar. Likewise, selection of one or more of a plurality of other calendars from the other calendars selection pane 340 causes the display of the selected calendars. As should be appreciated, the other calendars selection pane may be populated by a given user with a plurality of calendars of friends, colleagues, or other associates who have given the user permission to display their calendaring data, as described herein.

According to an embodiment of the present invention, each viewed calendar 240, 250, 260 may be displayed with a different background color 370 to distinguish displayed calendars. The background coloring 370 for the displayed calendars may likewise be utilized in the other calendars selection pane 340 to provide background coloring for selected calendars to provide the user a quick and efficient means for identifying selected calendars.

When a user creates an all day event, an all day event banner 360 is displayed. The banner appointments show up in an area at the top of the daily views, illustrated in FIG. 3.

This area is above the time bar 350 and does not correspond to a particular time position. Because the banner area may be enlarged to include a plurality of banner appointments, enlargement of the banner area for any given selected calendar 240, 250, 260 causes a like enlargement of the banner area for all displayed calendars. The aggregate view module 220 inquires of each calendar view 240, 250, 260 as to how much space is required for banner appointments for the selected calendars. The aggregate view module 220 then requires space corresponding to the largest amount of required banner appointment space for each of the displayed calendars 240, 250, 260.

Having described a relationship between the calendaring application 200, the frame module 210, the aggregate view module 220 and selected calendar views 240, 250, 260 with respect to FIG. 2, and having described the user interface and other display characteristics of the shared calendar view according to embodiments of the present invention, with respect to FIG. 3, the following is a further discussion of the functionality of the aggregate view module 220. As described herein, the aggregate view module 220 hosts the plurality of selected calendar views 240, 250, 260. The aggregate view module 220 orchestrates the processes for creating, displaying, and deleting selected calendar views 240, 250, 260. Additionally, the aggregate view module hosts and directs the display of other user interface information including components of the navigation control 310.

The aggregate view module 220 coordinates the time bar 350. According to an embodiment of the present invention, selected calendar may have a time bar 350 if the calendar is in a view mode requiring a time bar. However, because each calendar is synchronized so that movement along the time positions of one calendar causes a like movement of time positions for all displayed calendars, the aggregate view module 220 displays only one time bar 350 for all displayed calendars 240, 250, 260 and hides the time bars that ordinarily would be displayed for each other displayed calendar 240, 250, 260 if the calendars are in a view mode requiring a time bar.

The aggregate view module 220 also coordinates the display of and use of the scroll bar 375. As with the time bar 350, each displayed calendar 240, 250, 260 includes a scroll bar 375 according to its individual view data object. However, the aggregate view module shows only one scroll bar 375 for scrolling each of the displayed calendars simultaneously. The aggregate view module coordinates scrolling among all calendars. Scrolling can be initiated through a number of means, including use of the scroll bar, a mouse wheel, arrow keys, and the like. Typically these events are directed to individual calendars 240, 250, 260. According to an embodiment of the present invention, if the user scrolls an individual selected calendar 240, 250, 260, the software code responsible for the individual scrolled calendar communicates the scrolling to the aggregate view module which in turn directs all other displayed calendars 240, 250, 260 to scroll in synchronized movement with the selected calendar. As described above, selection of a particular view mode for one selected calendar, such as daily, weekly, monthly, etc. likewise causes each other selected calendar to be displayed in the same view mode.

Additionally, the aggregate view module manages the utilization of space in the display frame 210 by all selected user interface components including the displayed calendars, the navigation pane 310, the time bar 350, the scroll bar 375, and the tool bar 380. That is, the aggregate view decides how to divide the visual geometry of the main display frame into the sections for each selected calendar view as well as other components such as the navigation pane 310, scroll bar 375, time bar 350 and tool bar 380. When the spatial needs require, such as when the window or frame is resized by the user, or when an additional calendar 240, 250, 260 is added or deleted, the aggregate view module 220 resizes and relocates all displayed components appropriately. Accordingly, if the user selects an additional calendar for display so that the calendar view illustrated in FIG. 3 will include four selected calendars, for example, the aggregate view module 220 will determine the space requirements for displaying the four selected calendars and will resize each selected calendar accordingly to fit each of the four selected calendars in the common view illustrated in FIG. 3. Likewise, if the user deletes a selected calendar, the aggregate view module 220 will expand the remaining selected calendars to fit the available space in which to display.

According to embodiments of the present invention, the aggregate view module 220 also routes various messages, notifications, queries, and commands to the appropriate selected calendars 240, 250, 260. In some cases, a message is only routed to the active calendar 240, 250, 260. For example, accessibility messages are sent directly to the active calendar. Thus, screen readers and other accessibility tools may determine what appointments are displayed on the active calendar only. As described above, the user may select another displayed calendar 240, 250, 260 as the active calendar as desired. Other types of messages may be sent to all displayed calendars. For example, as described above, if global display settings changes, such as displayed fonts, display sizes, and other formatting information including system colors are changed, the aggregate view module 220 is notified and in turn directs all displayed calendars 240, 250, 260 to make required displayed changes.

Figure 4:
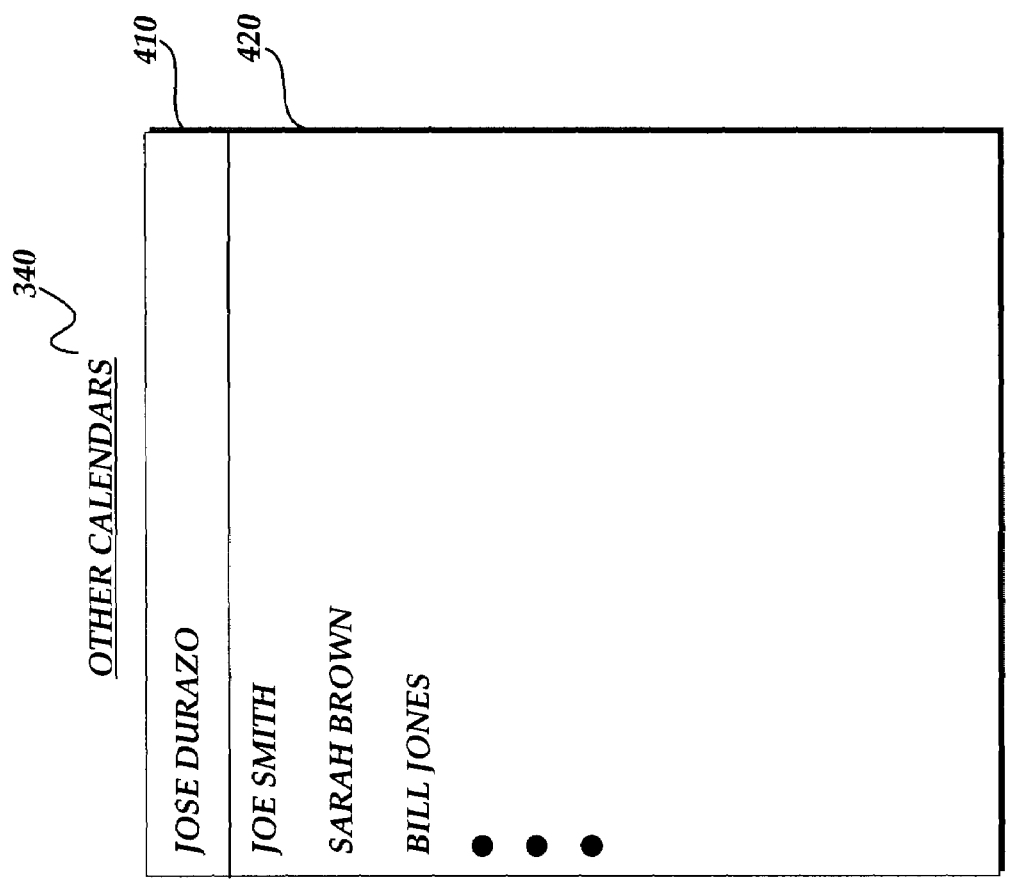
FIG. 4 is a computer screen display illustrating selection of other shared calendars for display in a common view of shared calendars.

FIG. 4 is a computer screen display illustrating selection of other shared calendars for display in a common view of shared calendars. As described above with reference to FIG. 3 an other calendars selection control 340 is provided in the navigation pane 310. In addition to the display of previously selected other calendars in the control 340, an other calendars search control 410 may be provided in the control 340. As shown in FIG. 4, the search control 410 allows a user to enter the name of a friend or associate whose calendar information the user wishes to display in the common view of shared calendars. A drop down contacts list 420 may also be provided to allow the user to parse a list of available calendar data for selection by the user. Once the user has selected an additional calendar for display by the user, a selection control for that user may be subsequently displayed as illustrated in FIG. 3. Likewise, the user may delete a previously utilized calendar selection control from the control 340 so that the selection control no longer appears in the control 340 for selection by the user.

Figure 5:
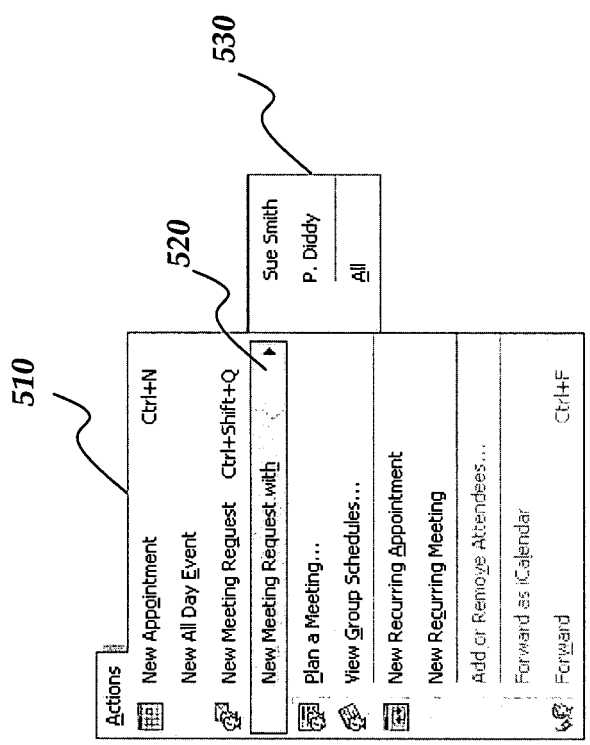
FIG. 5 is a computer screen display showing an actions menu of actions that may be applied to selected dates or times in a given electronic calendar.

FIG. 5 is a computer screen display showing an actions menu of actions that may be applied to selected dates or times in a given electronic calendar. According to embodiments of the present invention, the user may advantageously view the calendaring data of all selected displayed calendars simultaneously. For example, if the user is interested in requesting a meeting with two of the users colleagues, the user may select each of the colleague's calendars 250, 260 for display next to the user's calendar 240, as illustrated in FIG. 3. The user may then select an actions menu 510 as illustrated in FIG. 5 to select a variety of calendaring actions including a new meeting request action 520. According to embodiment of the present invention, each of the selected shared calendar owner's names are populated in a control 530 to allow the user to readily select the names associated with each of the selected calendars for the desired action such as the new meeting request action 520. If the user selects a name from the control 530, the calendaring application 200 will open a meeting request form prepopulated with the name of the user and the person selected from the control 530. If the user selects "All," a meeting request form may be created prepopulated with the users name and with the names associated with all selected shared calendars. It should be appreciated that the user may view the calendaring data of each selected calendar, but the user may not write data to the selected other calendars, unless the user has permission to write to the selected calendar.

Figure 6:
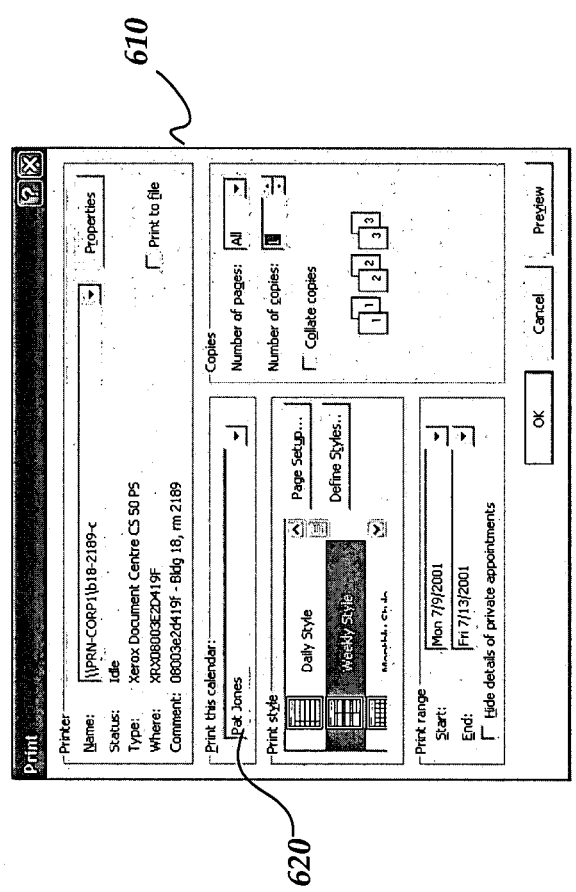
FIG. 6 is a computer screen display of a print function dialog according to an embodiment of the present invention.

FIG. 6 is a computer screen display of a print function dialog according to an embodiment of the present invention. According to embodiment of the present invention, a drop down menu such as the "Print this calendar" drop down menu 620 may be provided to allow the user to select for printing any of the selected shared calendars presently displayed by the user.

Figure 7:
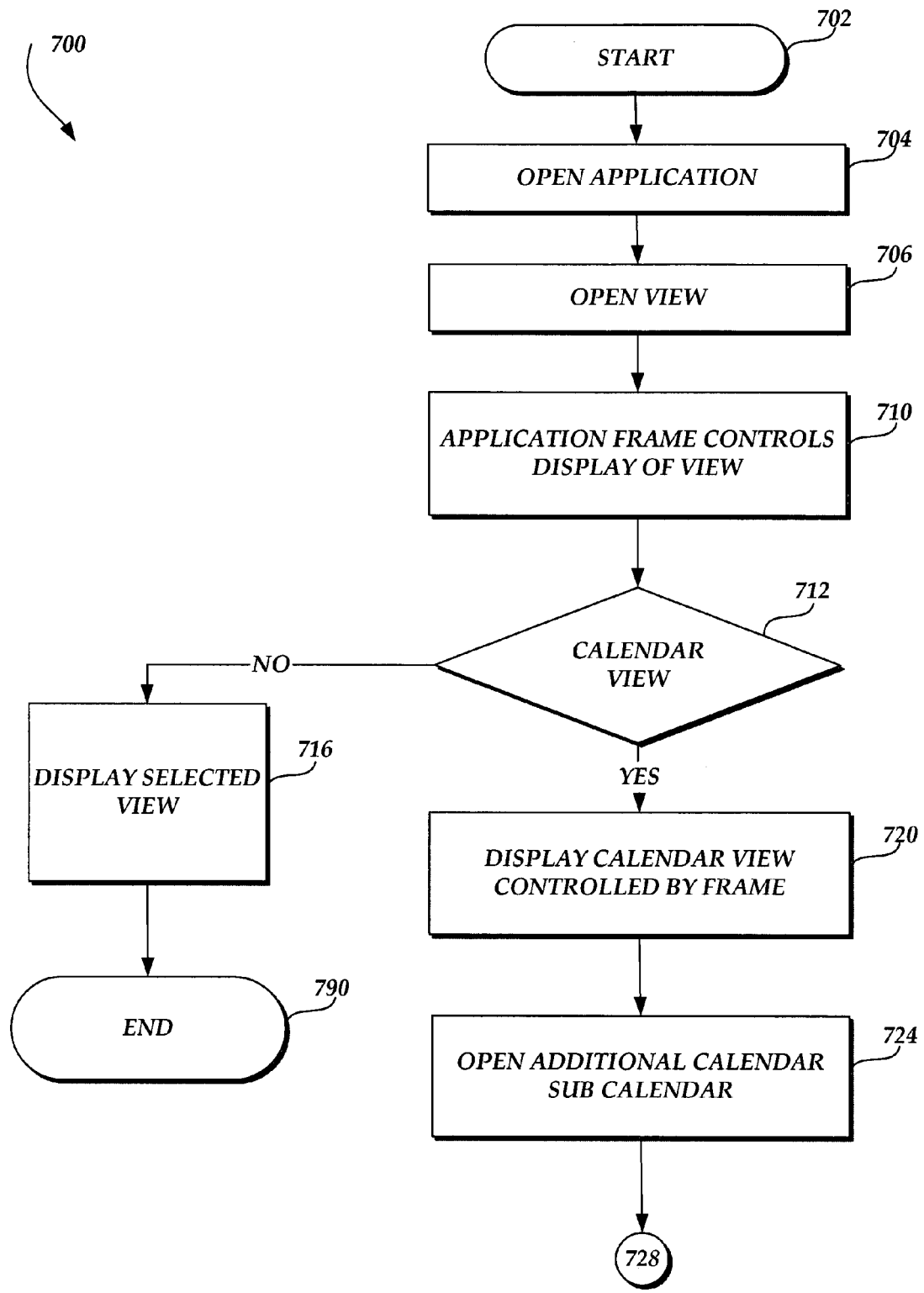
FIGS. 7, 8, 9 and 10 are flow diagrams showing an illustrative routine for creating and displaying a common view of shared electronic calendars.
Figure 8:
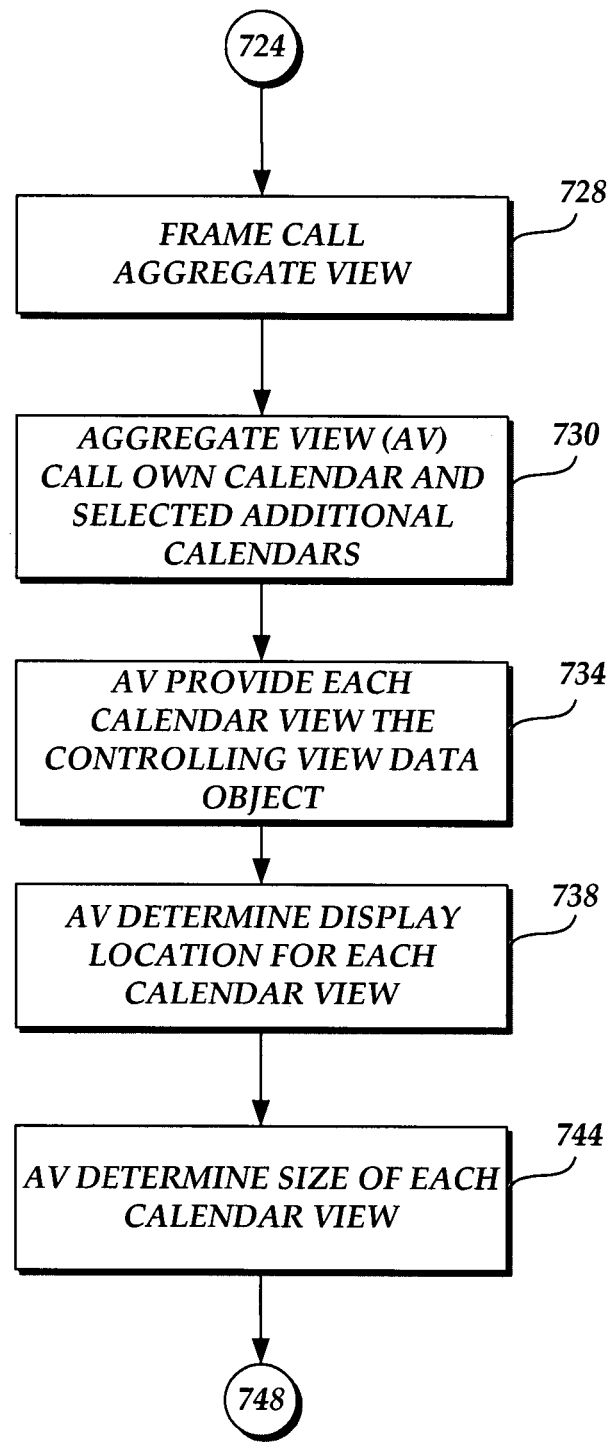
Figure 9:
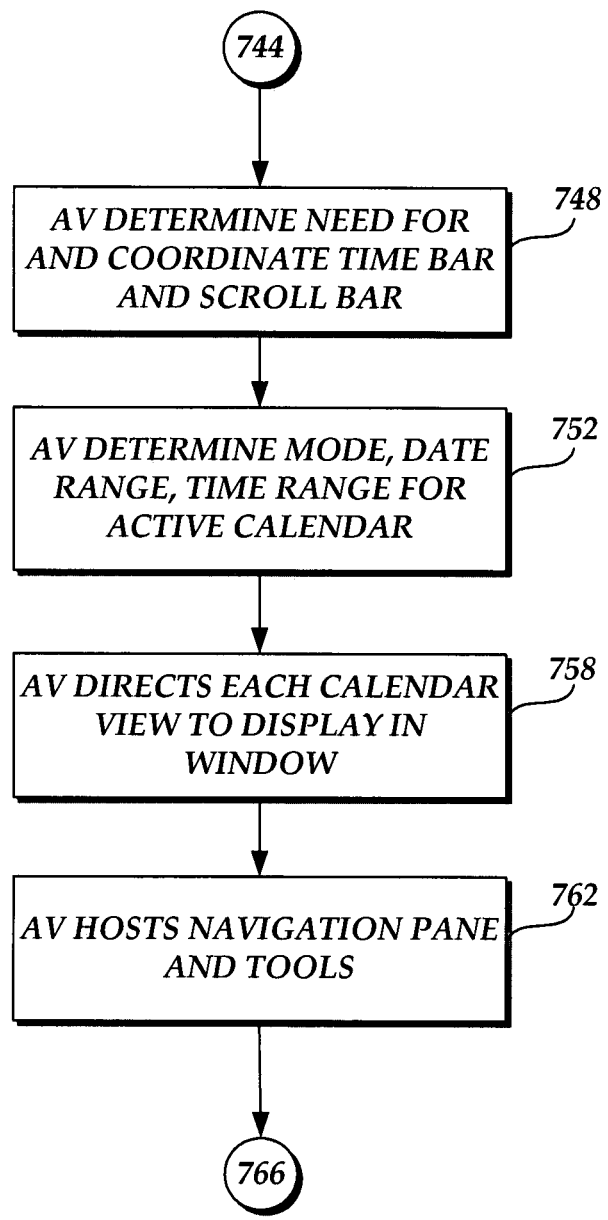

FIGS. 7, 8 and 9 are flow diagrams showing an illustrative routine for creating and displaying a common view of shared electronic calendars. The method 700 begins at start block 702 and proceeds to block 704 where a user opens a calendaring application 200, as described above. At block 706 the user selects a particular view for opening, such as a calendar view, contacts view, and the like. At block 710, the application frame module 210 controls the display of the view selected by the user. At block 712 a determination is made as to whether the view selected by the user is a calendar view. If the view selected by the user is a non-calendar view, such as a contacts view 230, the method proceeds to block 716 and the selected view is displayed, and the method ends at block 790. If a calendar view is selected by the user, the method proceeds to block 720 and the calendar view is displayed as controlled by the frame module 210.

At block 724, the user selects an additional calendar 250, 260 for display along with the user's own calendar 240. At block 728, FIG. 8, the frame module 210 calls on the aggregate view module 220 to control the display of the plurality of selected calendar views. At block 730, the aggregate view module calls the user's calendar and all selected additional calendars. It should be appreciated, that the user may select for view other calendars, but not select the user's own calendar. That is, it is not necessary according to embodiments of the present invention that the user must first select his or her own calendar followed by the selection of other calendars. Any combination of selected calendars may be displayed according to embodiments of the present invention if the user has permission to display calendaring data associated with the selected calendars.

At block 734, the aggregate view module provides each selected calendar view the controlling view data object. As should be understood by those skilled in the art, the controlling view data object includes the view mode, and other display settings of a parent or first selected calendar. That is, if the first selected calendar is the user's own calendar or if the first selected calendar is from the other calendars control, the view data object for the first selected or parent calendar is provided to each additional selected calendar so that each additional selected calendar will be displayed in a common view mode and common display settings as the first displayed calendar. According to embodiments of the present invention, once a view data object is established for all displayed calendars, that view data object is maintained for displayed calendars even if the first selected or parent calendar is later deleted from display. Thus, whether a displayed calendar is deleted or whether an additional calendar is displayed, the view data object of the first selected calendar is passed to all other selected calendars by the aggregate view module to control display of other selected calendars.

At block 738, the aggregate view module 220 determines a display location for each calendar view. At block 744, the aggregate view module determines a size for each calendar view. For example, the first selected calendar view may require a larger size than subsequent calendar views if the first calendar view requires additional space for a time bar 350. The remaining available space is divided by the aggregate view module between other selected calendars so that each selected calendar including the first selected or parent calendar appears to take an equal amount of display space in the frame 215.

At block 748 the aggregate view module determines the need for and coordinates the use of a time bar a scroll bar. That is, if the view mode for each of the selected displayed calendars requires the use of a time bar, such as is necessary with a daily or hourly view mode, a time bar 350 is called by the aggregate view module. At block 752, the aggregate view module determines the view mode, a date range and time range for the active or selected calendar. At block 758, the aggregate view module directs each selected calendar view to display in the window or frame 215 according to the view data objects, view mode, date range, and time range of the active calendar.

Figure 10:
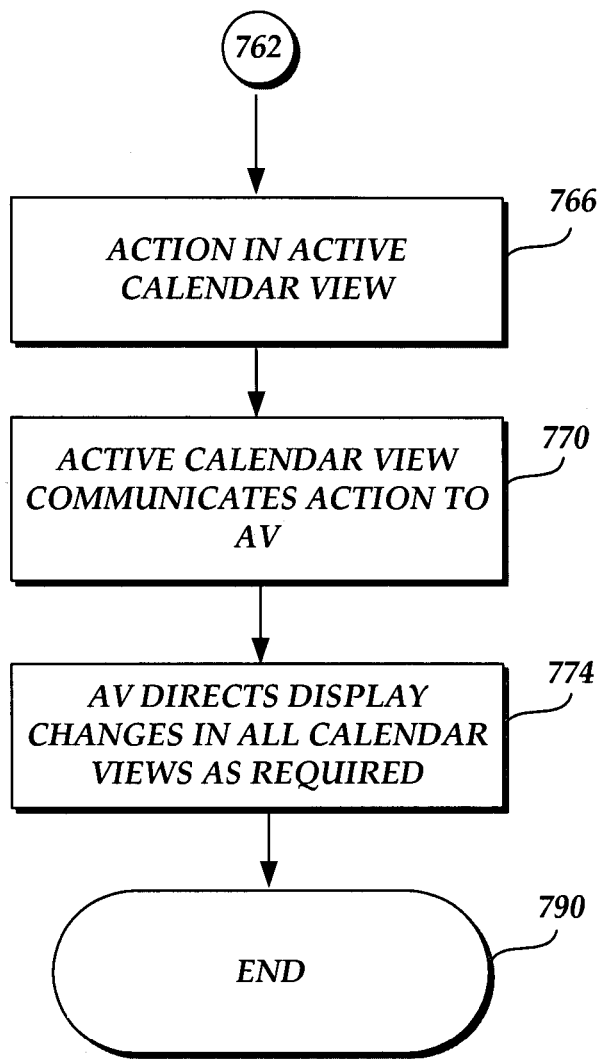

At block 762, the aggregate view module hosts and directs the display of other user interface components of the frame or window 215, including the navigation pane 310 and the tool bar 380. At block 766, FIG. 10, the user may select any displayed calendar to establish the selected displayed calendar as the active calendar, and the user may perform an action in the selected calendar. At block 770, the active calendar view communicates the selected action to the aggregate view module 220. At block 774, the aggregate view module 220 directs any required display changes caused by the user's actions in the active calendar to be made in all other selected displayed calendars. The method ends at block 790.

As described herein, embodiments of the present invention provide methods and systems for simultaneously displaying a plurality of shared electronic calendars in a single application window or frame where each displayed calendar is displayed in a common view mode in side-by-side orientation relative to each other. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for displaying shared electronic calendars, the method comprising:
   launching a calendar software application;
   selecting a plurality of calendars for displaying in a common display view frame,
   wherein selecting the plurality of calendars for displaying in the common display view frame comprises selecting at least one shared calendar;
   obtaining a view data object for a first selected calendar, the first selected calendar being associated with a first user;

calculating an amount of space of the view frame required for displaying each selected calendar simultaneously, each selected calendar being associated with at least one second user;

passing the view data object for the first selected calendar to each additional selected calendar, the view data object indicating a view mode corresponding to the first selected calendar, the view mode comprising at least one of the following: a position and a size of display associated with the first selected calendar;

displaying each selected calendar in the view frame simultaneously in side-by-side orientation and in the view mode indicated by the passed view data object, wherein displaying each selected calendar in the view frame simultaneously comprises:

displaying data associated with each displayed calendar in a particular displayed calendar to which the data is associated, wherein the data comprises textual information and a plurality of icons wherein each one of the plurality icons represents at least one action associated with a calendar event, displaying the first selected calendar at the indicated view mode with each selected shared calendar being aligned at the same indicated view mode as the first selected calendar after a first vertical scrolling of the first selected calendar, and manipulating the display of each selected calendar in response to a change in the view mode of the first selected calendar, the change in the view mode of the first selected calendar corresponding to a change in the position of display of the first selected calendar, wherein manipulating the display of each selected calendar comprises adjusting the alignment of each selected calendar so as to correspond to the changed position of display of the first selected calendar and;

displaying a tool bar for providing editing, display, file management, and printing functionality to specified displayed calendars.

2. The method of claim 1, further comprising, in response to selecting a plurality of calendars, calling an aggregate view module for displaying the selected plurality of calendars.

3. The method of claim 1, prior to calculating an amount of space of the view frame required for displaying each selected calendar simultaneously, determining a size of the view frame available for displaying all selected calendars simultaneously.

4. The method of claim 1, prior to passing the view data object for the first selected calendar to each additional selected calendar, calling each selected calendar by an aggregate view module responsible for displaying all selected calendars simultaneously.

5. The method of claim 1, wherein passing the view data object for the first selected calendar includes passing display settings of the first selected calendar to each additional selected calendar.

6. The method of claim 1, wherein passing the view data object for the first selected calendar includes determining whether the view mode of the first selected calendar requires a display of a time bar.

7. The method of claim 6, further comprising, if the display of a time bar is required, displaying a time bar for one of the plurality of displayed calendars the time bar being configured to cause, upon selection of a particular time position in the time bar, a display of the selected time position for each displayed calendar simultaneously.

8. The method of claim 1, prior to passing the view data object for the first selected calendar to each additional selected calendar, determining whether the view mode of the first selected calendar requires a display of a scroll bar.

9. The method of claim 8, further comprising, if the display of a scroll bar is required, providing a scroll bar for one of the plurality of displayed calendars.

10. The method of claim 1, further comprising:

displaying a calendar selection control for selecting the at least one shared calendar for display in the view frame in side-by-side orientation with other calendars presently displayed in the view frame;

in response to selection of an additional calendar for display from the calendar selection control, recalculating an amount of space of the view frame required for displaying each presently displayed calendar plus the selected additional calendar simultaneously in side-by-side orientation;

passing the view data object of the first selected calendar to the selected additional calendar;

passing a display position and display size to all presently displayed calendars and to the selected additional calendar; and redisplaying all presently displayed calendars plus the selected additional calendar simultaneously in side-by-side orientation.

11. The method of claim 1, further comprising providing a distinctive background display color for each displayed calendar to distinguish each displayed calendar from each other displayed calendar.

12. The method of claim 1, further comprising selecting one of the plurality of displayed calendars as an active calendar; and applying any view mode and display settings changes made to the active calendar to all displayed calendars.

13. The method of claim 12, wherein applying any view mode and display settings changes made to the active calendar to all displayed calendars includes communicating any changes in the view mode and display settings for the active calendar to each of the displayed calendars.

14. The method of claim 1, further comprising deleting a displayed calendar from the view frame.

15. The method of claim 14, further comprising, in response to deleting a displayed calendar from the view frame, recalculating an amount of space of the view frame required for displaying each displayed calendar minus the deleted displayed calendar;

passing the view data object of the first selected calendar to each displayed calendar minus the deleted displayed calendar;

passing a display position and display size to all displayed calendars minus the deleted displayed calendar; and redisplaying all displayed calendars minus the deleted displayed calendar simultaneously in side-by-side orientation.

16. The method of claim 1, further comprising displaying an all day banner appointment position across all displayed calendars.

17. The method of claim 1, wherein displaying each selected calendar in the view frame simultaneously in side-by-side orientation includes displaying each selected calendar such that one of: each date and each time position of each displayed calendar is aligned with corresponding one of: each date and each time positions of each other displayed calendar.

18. The method of claim 17, further comprising displaying a date selection control configured to, upon selection of a date from the date selection control, cause a display of a calendar position of each displayed calendar corresponding to a selected date simultaneously.

19. A computer readable system memory containing instructions which when executed by a computer perform a method for displaying shared electronic calendars, the method executed by the instructions comprising:
- launching a calendar software application;
- obtaining a view data object for a first selected calendar, the first selected calendar being associated with a first user;
- calculating an amount of space of the view frame required for displaying each of a selected plurality of calendars simultaneously, the selected plurality of calendars being associated with at least one second user;
- passing the view data object for the first selected calendar to each additional selected calendar of the plurality of calendars, the view data object indicating a view mode corresponding to the first selected calendar;
- displaying each selected calendar in the view frame simultaneously in side-by-side orientation and in the view mode indicated by the passed view data object, wherein displaying each selected calendar in the view frame simultaneously comprises:
- displaying data associated with each displayed calendar in a particular displayed calendar to which the data is associated, wherein the data comprises textual information and a plurality of icons wherein each one of the plurality icons represents at least one action associated with a calendar event,
- displaying the first selected calendar associated with the first user at the same position of display as each selected shared calendar associated with the at least one second user after a first vertical scrolling of the first selected calendar, wherein displaying each selected calendar at the same position of display comprises displaying each selected calendar at one of the following: a common time position and a common date position, and
- aligning the display of each selected shared calendar in response to a change in the view mode of the first selected calendar, the change in the view mode of the first selected calendar corresponding to a change in the position of display of the first selected calendar, wherein aligning the display of each selected calendar comprises adjusting an alignment of each selected calendar so as to correspond to the changed position of display of the first selected calendar; and
- displaying a tool bar for providing editing, display, file management, and printing functionality to specified displayed calendars.

20. The computer readable system memory of claim 19, prior to passing the view data object for the first selected calendar to each additional selected calendar, calling each selected calendar by an aggregate view module responsible for displaying all selected calendars simultaneously.

21. The computer readable system memory of claim 19, wherein passing the view data object for the first selected calendar includes passing display settings of the first selected calendar to each additional selected calendar.

22. The computer readable system memory of claim 19, wherein passing the view data object for the first selected calendar includes determining whether the view mode of the first selected calendar requires a display of a time bar.

23. The computer readable system memory of claim 22, further comprising, if the display of a time bar is required, displaying a time bar for one of the plurality of displayed calendars, the time bar being configured to, upon selection of a particular time position in the time bar, cause a display of the selected time position for each displayed calendar simultaneously.

24. The computer readable system memory of claim 19, prior to passing the view data object for the first selected calendar to each additional selected calendar,
- determining whether the view mode of the first selected calendar requires a display of a scroll bar; and
- if the display of a scroll bar is required, providing a scroll bar for one of the plurality of displayed calendars.

25. The computer readable system memory of claim 19, further comprising displaying a date selection control configured to cause, upon a selection of a date from the date selection control, a display of a calendar position of each displayed calendar corresponding to the selected date simultaneously.

26. The computer readable system memory of claim 19, further comprising:
- displaying a calendar selection control for selecting the at least one calendars for display in the view frame in side-by-side orientation with other calendars presently displayed in the view frame;
- in response to selection of an additional calendar for display from the calendar selection control, recalculating an amount of space of the view frame required for displaying each presently displayed calendar plus the selected additional calendar simultaneously in side-by-side orientation;
- passing the view data object of the first selected calendar to the selected additional calendar;
- passing a display position and display size to all presently displayed calendars and to the selected additional calendar; and
- redisplaying all presently displayed calendars plus the selected additional calendar simultaneously in side-by-side orientation.

27. The computer readable system memory of claim 19, further comprising receiving a selection of one of the plurality of displayed calendars as an active calendar;
- communicating any changes in the view mode and display settings for the active calendar to each of the displayed calendars; and
- applying any view mode and display settings changes made to the active calendars to all displayed calendars.

28. The computer readable system memory of claim 19, further comprising:
- receiving a deletion of a displayed calendar from the view frame;
- in response to receiving the deletion of a displayed calendar from the view frame,
- recalculating an amount of space of the view frame required for displaying each displayed calendar minus the deleted displayed calendar;
- passing the view data object of the first selected calendar to each displayed calendar minus the deleted displayed calendar;
- passing a display position and display size to all displayed calendars minus the deleted displayed calendar; and
- redisplaying all displayed calendars minus the deleted displayed calendar simultaneously in side-by-side orientation.

29. A system for displaying shared electronic calendars, the system comprising:
- a memory storage; and
- a processing unit coupled to the memory storage, wherein the processing unit is operative to:

launch a calendar software application;
obtain a view data object for a first selected calendar, the first selected calendar corresponding to a first user of the calendar software application;
calculate an amount of space of the view frame required for displaying each of a selected plurality of calendars simultaneously, the selected plurality of calendars corresponding to a plurality of additional users;
pass the view data object for the first selected calendar to each additional selected calendar of the plurality of calendars after a first vertical scrolling of the first selected calendar, the view data object indicating a view mode corresponding to the first selected calendar, the view mode comprising at least one of the following: a position and a size of display associated with the first selected calendar;
pass to each selected calendar the position of display in the view frame;
pass to each selected calendar the size of display in the view frame;
display each selected calendar in the view frame simultaneously in side-by-side orientation and in the view mode indicated by the passed view data object, wherein the processing unit being operative to display each selected calendar in the view frame simultaneously comprises the processing unit being operative to:
  display appointments associated with each user of each selected calendar in a separately displayed calendar;
  display data associated with each appointment, wherein the data comprises textual information and a plurality of icons wherein each one of the plurality icons represents at least one action associated with the appointment;
  display the first selected calendar at the indicated view mode with each selected shared calendar being aligned at the same indicated view mode as the first selected calendar, the view mode indicating the position of display within the calendar, and
  adjust the display of each selected calendar so as to correspond to a changed position of display of the first selected calendar in response to a change in the view mode of the first selected calendar, the change in the view mode of the first selected calendar corresponding to a change in the position of display of the first selected calendar, wherein the processing unit being operative to adjust the display of each selected calendar comprises the processing unit being operative to change a position of display for each selected calendar such that the separately displayed calendars remain in a side-by-side orientation with each separately displayed calendar displaying only its corresponding user's appointments; and
  display a tool bar for providing editing, display, file management, and printing functionality to specified displayed calendars.

30. The system of claim 29, wherein the processing unit is operative to call each selected calendar by an aggregate view module responsible for displaying all selected calendars simultaneously prior to passing the view data object for the first selected calendar to each additional selected calendar.

31. The system of claim 29, wherein the processing unit is operative to pass the view data object for the first selected calendar comprises the processing unit being operative to pass display settings of the first selected calendar to each additional selected calendar.

32. The system of claim 29, wherein the processing unit is operative to pass the view data object for the first selected calendar comprises the processing unit being operative to determine whether the view mode of the first selected calendar requires a display of a time bar.

33. The system of claim 32, wherein the processing unit is operative to display a time bar for one of the plurality of displayed calendars when the display of a time bar is required, the time bar being configure to, upon selection of a particular time position in the time bar, cause a display of the selected time position for each displayed calendar simultaneously.

34. The system of claim 29, wherein the processing unit is operative to, prior to passing the view data object for the first selected calendar to each additional selected calendar,
  determine whether the view mode of the first selected calendar requires a display of a scroll bar; and
  provide a scroll bar for one of the plurality of displayed calendars.

35. The system of claim 29, wherein the processing unit is operative to display a date selection control configured to, upon selection of a date from the date selection control, cause a display of a calendar position of each displayed calendar corresponding to the selected date simultaneously.

36. The system of claim 29, wherein the processing unit is further operative to:
  display a calendar selection control for selecting at least one calendar for display in the view frame in side-by-side orientation with other calendars presently displayed in the view frame;
  in response to selection of an additional calendar for display from the calendar selection control, recalculate an amount of space of the view frame required for displaying each presently displayed calendar plus the selected additional calendar simultaneously in side-by-side orientation;
  pass the view data object of the first selected calendar to the selected additional calendar;
  pass a display position and display size to all presently displayed calendars and to the selected additional calendar; and
  redisplay all presently displayed calendars plus the selected additional calendar simultaneously in side-by-side orientation.

37. The system of claim 29, wherein the processing unit is further operative to:
  receive a selection of one of the plurality of displayed calendars as an active calendar;
  communicate any changes in the view mode and display settings for the active calendar to each of the displayed calendars; and
  apply any view mode and display settings changes made to the active calendars to all displayed calendars.

38. The system of claim 29, wherein the processing unit is further operative to:
  receive a deletion of a displayed calendar from the view frame;
  in response to receiving the deletion of a displayed calendar from the view frame, recalculate an amount of space of the view frame required for displaying each displayed calendar minus the deleted displayed calendar;

pass the view data object of the first selected calendar to each displayed calendar minus the deleted displayed calendar;

pass a display position and display size to all displayed calendars minus the deleted displayed calendars; and redisplay all displayed calendars minus the deleted displayed calendar simultaneously in side-by-side orientation.

39. A computer readable memory containing instructions which when executed by a computer perform a method for displaying shared electronic calendars, the method executed by the instructions comprising:

launching a calendar software application;

displaying a first calendar;

receiving an indication of a calendar associated with a second user;

determining an amount of space of a view frame for displaying a second calendar;

obtaining a view data object for the first calendar and passing the view data object to the second calendar, the view data object indicating a view mode;

displaying the second calendar simultaneously in side-by-side orientation with the first calendar and in the view mode indicated by the passed view data object;

displaying data associated with each displayed calendar in a particular displayed calendar to which the data is associated, wherein the data comprises textual information and a plurality of icons wherein each one of the plurality icons represents at least one action associated with a calendar event;

displaying the first calendar at the view mode with the second calendar being aligned at the same view mode as the first calendar after a first vertical scrolling of the first calendar;

manipulating the display of the second calendar in response to a change in the view mode of the first selected calendar, the change in the view mode of the first calendar corresponding to a change in the position of display of the first calendar, wherein manipulating the display of each selected calendar comprises adjusting the alignment of each selected calendar so as to correspond to the changed position of display of the first selected calendar; and displaying a tool bar for providing editing, display, file management, and printing functionality to specified displayed calendars.

40. The computer readable memory of claim 39, further comprising:

receiving a selection of a date;

simultaneously displaying the first calendar and the second calendar at the selected date in the side-by-side orientation.

\* \* \* \* \*